United States Patent
Tulewicz et al.

(10) Patent No.: US 10,708,639 B1
(45) Date of Patent: *Jul. 7, 2020

(54) STATE-BASED IMAGE DATA STREAM PROVISIONING

(71) Applicant: Amazon Technologies, Inc., Seattle, WA (US)

(72) Inventors: Mark Roger Tulewicz, Bellevue, WA (US); Torquil J B Shaw, Seattle, WA (US); Joel Levi Anderson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/083,253

(22) Filed: Mar. 28, 2016

(51) Int. Cl.
| | |
|---|---|
| *A63F 9/24* | (2006.01) |
| *H04N 21/2365* | (2011.01) |
| *A63F 13/86* | (2014.01) |
| *H04N 21/239* | (2011.01) |
| *H04N 21/235* | (2011.01) |
| *H04N 21/242* | (2011.01) |
| *A63F 13/00* | (2014.01) |
| *G06F 17/00* | (2019.01) |
| *G06F 19/00* | (2018.01) |

(52) U.S. Cl.
CPC ......... *H04N 21/2365* (2013.01); *A63F 13/86* (2014.09); *H04N 21/239* (2013.01); *H04N 21/2353* (2013.01); *H04N 21/242* (2013.01)

(58) Field of Classification Search
CPC .. A63F 13/86; H04N 21/2353; H04N 21/239; H04N 21/242
USPC .......... 725/38, 41, 43, 48, 53; 463/2, 40, 42
See application file for complete search history.

(56) References Cited

U.S. PATENT DOCUMENTS

| | | | |
|---|---|---|---|
| 2008/0070686 A1* | 3/2008 | Satsukawa | ............ A63F 13/005 463/37 |
| 2009/0009605 A1 | 1/2009 | Ortiz | |
| 2010/0079670 A1* | 4/2010 | Frazier | ............... H04N 5/44591 348/564 |
| 2010/0190555 A1 | 7/2010 | Dutilly et al. | |
| 2011/0269548 A1 | 11/2011 | Barclay et al. | |

(Continued)

OTHER PUBLICATIONS

U.S. Appl. No. 15/083,220, filed Mar. 28, 2016, Tulewicz et al.

(Continued)

*Primary Examiner* — Nnenna N Ekpo
(74) *Attorney, Agent, or Firm* — BakerHostetler

(57) ABSTRACT

Techniques for state-based provisioning of image data streams are described herein. In some examples, a plurality of image data streams, such as video streams, may be captured from one or more electronically presented content items. Upon being captured, the image data streams may be transmitted to an image data streaming service, such as a video streaming service, for transmission to spectators or other viewers. In addition to the image data, state data associated with the image data streams may also be transmitted to the image data streaming service. The state data may include information that describes the contents of the image data streams. In some examples, the image data streaming service may use the state data to provision the image data streams, for example to determine one or more image data streams that match a viewer's interest and to transmit those streams to the viewer.

19 Claims, 14 Drawing Sheets

(56) References Cited

U.S. PATENT DOCUMENTS

| | | | |
|---|---|---|---|
| 2012/0142429 A1 | 6/2012 | Muller | |
| 2013/0007298 A1 | 1/2013 | Ramaswamy et al. | |
| 2013/0044100 A1 | 2/2013 | King | |
| 2013/0170813 A1 | 7/2013 | Woods et al. | |
| 2014/0038708 A1* | 2/2014 | Davison | A63F 13/12 463/31 |
| 2014/0162785 A1* | 6/2014 | Reiche | A63F 13/12 463/35 |
| 2015/0066919 A1 | 3/2015 | Park et al. | |
| 2016/0067612 A1* | 3/2016 | Ntoulas | A63F 13/67 463/29 |
| 2016/0165310 A1* | 6/2016 | Flanagan | H04N 21/47214 725/46 |
| 2017/0270128 A1 | 9/2017 | Smith et al. | |
| 2017/0277253 A1* | 9/2017 | Mullen | G06F 3/01 |

OTHER PUBLICATIONS

U.S. Appl. No. 15/083,191, filed Mar. 28, 2016, Xi et al.
U.S. Appl. No. 15/083,243, filed Mar. 28, 2016, Tulewicz et al.
U.S. Appl. No. 15/083,191; Non-Final Office Action; dated Jan. 27, 2017; 19 pages.
U.S. Appl. No. 15/083,191; Final Office Action; dated Jul. 19, 2017; 18 pages.
U.S. Appl. No. 15/083,191; Non-Final Office Action; dated Dec. 29, 2017; 18 pages.
U.S. Appl. No. 15/083,243; Non-Final Office Action; dated Dec. 30, 2016; 13 pages.
U.S. Appl. No. 15/083,243; Final Office Action; dated May 11, 2017; 14 pages.
U.S. Appl. No. 15/083,243; Non-Final Office Action; dated Nov. 3, 2017; 15 pages.
U.S. Appl. No. 15/083,220; Non-Final Office Action; dated Jan. 27, 2017; 17 pages.
U.S. Appl. No. 15/083,220; Final Office Action; dated Jul. 19, 2017; 17 pages.
U.S. Appl. No. 15/083,220; Non-Final Office Action; dated Jan. 2, 2018; 15 pages.
U.S. Appl. No. 15/083,191; Final Office Action; dated May 18, 2018; 18 pages.
U.S. Appl. No. 15/083,243; Final Office Action; dated May 1, 2018; 15 pages.
U.S. Appl. No. 15/083,220; Final Office Action; dated May 23, 2018; 15 pages.
U.S. Appl. No. 15/083,243; Non-Final Office Action; dated Sep. 20, 2018; 15 pages.
U.S. Appl. No. 15/083,220; Non-Final Office Action; dated Oct. 4, 2018; 16 pages.
U.S. Appl. No. 15/083,191; Non-Final Office Action; dated Oct. 4, 2018; 20 pages.
U.S. Appl. No. 15/083,243; Final Office Action; dated Feb. 13, 2019; 11 pages.
U.S. Appl. No. 15/083,243; Final Office Action; dated Oct. 29, 2019; 12 pages.
U.S. Appl. No. 15/083,243; Non-Final Office Action; dated Jun. 13, 2019; 10 pages.
U.S. Appl. No. 15/083,220; Non-Final Office Action; dated Sep. 27, 2019; 16 pages.
U.S. Appl. No. 15/083,191; Non-Final Office Action; dated Sep. 30, 2019; 21 pages.
U. S. Appl. No. 15/083,243; Examiner-Initiated Interview Summary; dated Feb. 21, 2020; one page.

* cited by examiner

Viewer Attribute Subscription Interface 500

Game Type 510
- ☐ Football
- ☐ Racing
- ☒ Combat

Location Type 511
- ☒ City
- ☒ Jungle
- ☐ Mountains

Battle Size 512
- ☐ 2-10 Participants
- ☒ 11-50 Participants
- ☐ 50+ Participants Level 513
- ☐ 1 - Beginner
- ☒ 2 - Moderate
- ☐ 3 - Advanced Weapons 514
- ☐ Knife
- ☒ Sword
- ☒ Gun Battle Type 515
- ☐ Military / War
- ☒ Civilian
- ☒ Fantasy / Supernatural
- ☐ Competition Battle Participants (Player ID) 516
- ☐ Allen2873
- ☒ Bill8563
- ☐ Cam3839
- ☐ Dave2929
- ☒ Ed4045
- ☐ Frank9929
- ▷ More Currently Available Matching Stream Listing 520
- ☐ StreamX
- ☒ StreamY
- ☒ Stream Z Subscribe 599

FIG. 5

Producer Attribute Subscription Interface 600

Game Type 510
- ☐ Football
- ☐ Racing
- ☒ Combat

Location Type 511
- ☒ City
- ☒ Jungle
- ☐ Mountains

Battle Size 512
- ☐ 2-10 Participants
- ☒ 11-50 Participants
- ☐ 50+ Participants

Level 513
- ☐ 1 - Beginner
- ☒ 2 - Moderate
- ☐ 3 - Advanced

Weapons 514
- ☐ Knife
- ☒ Sword
- ☒ Gun

Battle Type 515
- ☐ Military / War
- ☒ Civilian
- ☒ Fantasy / Supernatural
- ☐ Competition

Battle Participants (Player ID) 516
- ☐ Allen2873
- ☒ Bill8563
- ☐ Cam3839
- ☐ Dave2929
- ☒ Ed4045
- ☐ Frank9929
- ▷ More

Kill Type (PRODUCER ONLY) 517
- ☒ Extreme
- ☐ Weapon
- ☐ Hand-to-hand

Currently Available Matching Stream Listing 520
- ☐ StreamX
- ☒ StreamY
- ☒ Stream Z

[ Subscribe 599 ]

FIG. 6

STATE-BASED IMAGE DATA STREAM PROVISIONING

BACKGROUND

In recent years, the popularity of electronically presented content items, such as video games, has increased dramatically. Due in part to this popularity, users of such content items may often broadcast video associated with their content interaction to other viewers. For example, players of a video game may often capture video associated with their rendered game view and then broadcast this video to other viewers, sometimes referred to as spectators, such as by using a video streaming service. Some video streaming services may make large numbers of streams available for viewing, potentially broadcast by many different players or other users participating in many different games or other content items. One limitation of video streaming services is that it may be often difficult for spectators to identify available streams that are of particular interest to the spectators. For example, spectators may often be interested in viewing video from particular locations and/or perspectives of a virtual game world, from particular players, levels, battles, matches, and having many other different types of attributes. However, spectators may have no interface or other means for indicating to a video streaming service which of these or other attributes are desired by the spectators for viewing. Additionally, the video streaming services may be unaware and have no way of determining which available video streams match certain desired spectator attributes. Furthermore, there may be no way for spectators to identify and request related video streams, such as views of a location or battle from multiple different perspectives, views from multiple characters on the same team or in the same character class, views of related battles, and many others. Moreover, there may be no functionality for presenting these multiple related streams in an efficient manner, such as by synchronizing display of the streams.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a diagram illustrating an example viewer attribute subscription interface that may be used in accordance with the present disclosure.

FIG. 6 is a diagram illustrating an example producer attribute subscription interface that may be used in accordance with the present disclosure.

DETAILED DESCRIPTION

Figure 1:
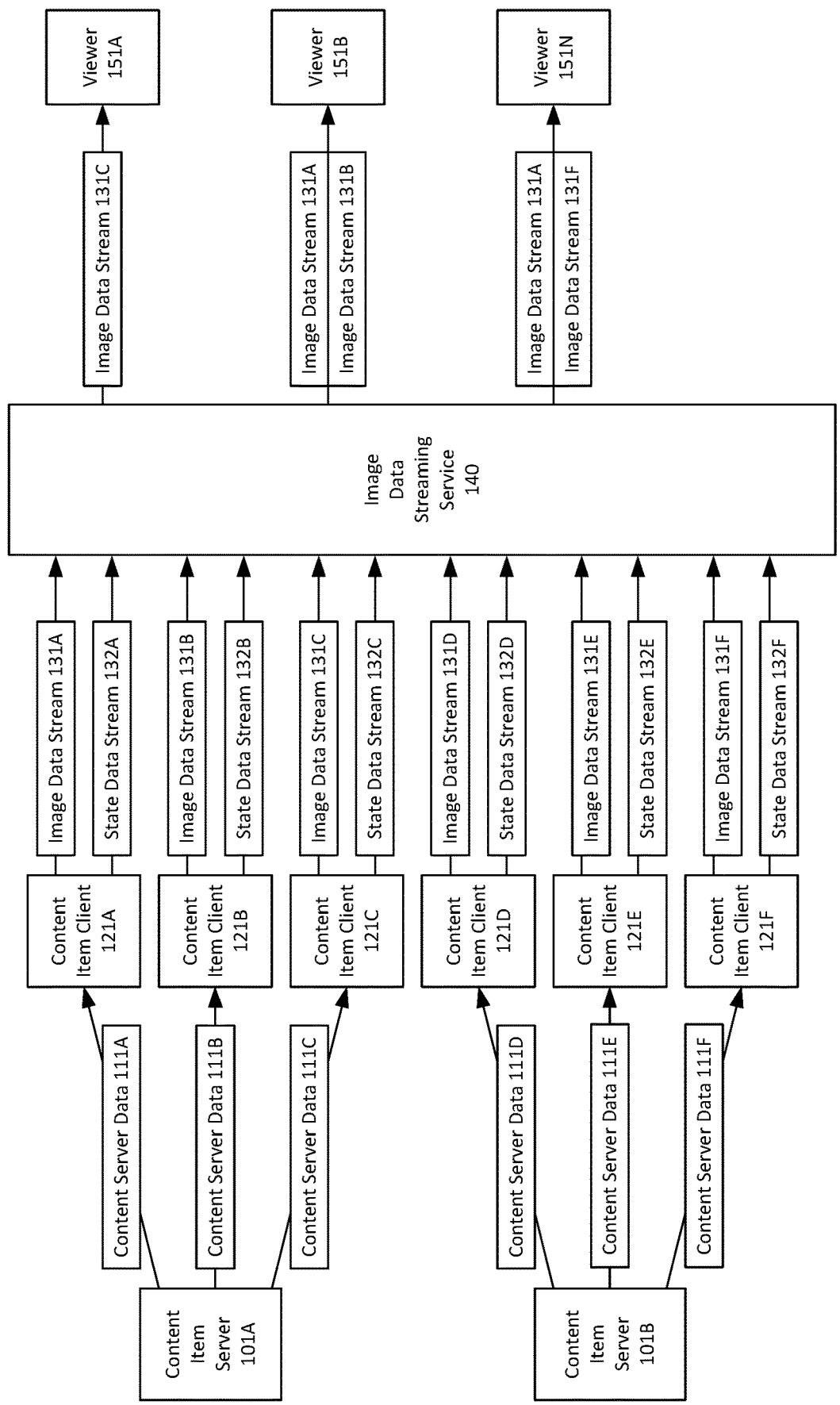
FIG. 1 is a diagram illustrating an example provisioning system with separate image data and state data streams that may be used in accordance with the present disclosure.

Techniques for state-based image data stream provisioning are described herein. In some examples, a plurality of image data streams, such as video streams, may be captured from one or more electronically presented content items, such as video games. Upon being captured, the image data streams may be transmitted to an image data streaming service, such as a video streaming service, for transmission to spectators or other viewers. For example, players in a video game may operate multiple clients that each display a respective game view, and the game views may be captured at each client and transmitted to a video streaming service. In addition to the image data, state data associated with the image data streams may also be transmitted to the image data streaming service. The state data may include information that describes the contents of the image data streams. In some examples, the state data may describe attributes such as game information (e.g., game name, game type, game server, player quantity), level, virtual location (e.g., coordinate values, name, identifier (ID), type), perspective (e.g., camera direction, pan, tilt), timing information, player/character information (e.g., player/character name, player/character ID, player/character class), team information, opponent information, battle or match information (e.g., match name, match ID, match type, match participants, match player quantity), kill information, hidden attributes (e.g., attributes that are not exposed to one or more players), and many other attributes. In some examples, the state data may include one or more tags and/or name value pairs, for example that indicate values for attributes such as those listed above. Also, in some examples, the state data may be updated to reflect changes in the content of the image data streams as those changes occur.

In some examples, the state data may be transmitted to the image data streaming service using state data streams. For example, each image data stream that is transmitted to the image data streaming service may have a respective state data stream that is also transmitted to the image data streaming service. In some cases, each client that captures and transmits an image data stream to the video streaming service may also transmit a respective state data stream. In other examples, the state data may be embedded or otherwise transmitted within the image data streams, for example within a header and/or other areas for a respective portion of image data. In some examples, state data for a content item may be transmitted from a content item server to a content item client, for example for use by the client in rendering of the image data. In some cases, the state data that is transmitted to the image data streaming service may include some or all of the state data that is transmitted from a content item server to a content item client. It is noted, however, that the state data that is transmitted to the image data streaming service need not necessarily include any or all of the exact state data that is transmitted from a content item server to a content item client. For example, in some cases, the state data that is transmitted to the image data streaming service may include metadata or other data that is generated based, at least in part, on state data from the content item server. This metadata may be generated by content item server applications, content item client applications, or both. In some examples, the image data streaming service may indicate, for example to content item developers, desired attributes, formats and/or protocols for the state data, for example by exposing a software development kit (SDK) or other information that indicates these desired attributes, formats and/or protocols. This may allow the content item developers to design content item server and/or client applications to generate the state data in a manner that can be easily and efficiently parsed and aggregated by the image data streaming service.

In some examples, upon receiving the image data streams and the state data, the image data streaming service may use the state data to provision the image data streams, for example to determine one or more image data streams that match a viewer's interest and to transmit those streams to the viewer. In some cases, a viewer may select, via an interface provided by the image data streaming service, one or more attribute values that are of particular interest to the viewer, such as particular virtual locations, perspectives, levels, battle types, battle sizes, and many others. The viewer may then be subscribed to these selected attribute values. The image data streaming service may then monitor the received state data to determine when one or more of the received image data streams have attribute values that at least partially match the attribute values to which the viewer is subscribed. These matching image data streams may then be transmitted to the viewer, thereby allowing the viewer to receive image data streams that are of particular interest to the viewer. In another example, the image data streaming service may provide an interface that indicates currently available image data streams and their current respective attribute values as indicated by the state data. Viewers may then use this interface to browse available image data streams and select one or more streams that are of particular interest to the viewers. In one specific example, the state data may be used by the image data streaming service to generate a map of a virtual game world and to use the map to indicate virtual locations associated with received image data streams as well as other attributes of those streams.

As yet another example, in some cases, when a particular image data stream is being transmitted to a viewer, the image data streaming service may use state data to identify one or more other image data streams that are related to the transmitted image data stream. For example, the image data streams may be related based on having at least partially similar state data, such as one or more matching or associated attribute values. For example, in some cases, the state data may be used to identify additional views of a particular battle from different perspectives, such as perspectives associated with different players. The viewer may then be presented with the option to receive these additional image data streams. Upon receipt, the viewer may be presented with various options for viewing the multiple related data streams, such as using a split screen presentation, a periodically alternating stream presentation, or a picture-in-picture stream presentation. In some examples, when multiple related streams are presented simultaneously, the presentation of the streams may be synchronized such that simultaneously occurring events from the different streams are presented simultaneously.

In some cases, certain viewers may enlist themselves to receive one or more video streams that are selected by other viewers and/or selectors, referred to hereinafter as producers. For example, producers may create image data stream channels that are subscribed to by other viewers. In some cases, when a producer's channel is subscribed to by other viewers, this may enhance the producer's popularity and reputation. In some examples, producers may use the interfaces provided by the image data streaming service to select video streams that are potentially of interest to the producers and their enlisted viewers. Also, in some examples, producers (or possibly other authorized users) may be provided with specialized ability to request and receive certain state data. For example, in some cases, at least part of state data for one or more attributes may be restricted such that it is only made available to producers. Additionally, in some examples, producers may be capable of creating and defining their own specialized attributes and requesting state data associated with those attributes. For example, a producer may be able to combine certain attributes and/or attribute values and tag them with another attribute and/or attribute value, such as combining a "sword" attribute value and a "shield" attribute value to a more encompassing attribute value such as "medieval." Furthermore, in some examples, producers may be provided access to an SDK and/or other interfaces of the image data streaming service, for example for use in creating and defining their own specialized attributes. Moreover, in some examples, in addition to stream selection, a producer may be provided with other controls and interfaces with extended capabilities, such as adding visual effects, advertisements, and/or other features.

Some example systems for content image data stream provisioning will now be described in detail. In particular, FIG. 1 is a diagram of an example provisioning system that employs separate image data and state data streams. As shown in FIG. 1, content item servers 101A and 1010B operate to manage content items, such as video games, other entertainment or media items, productivity items, and other types of content. Specifically, content item server 101A manages a content item in which content item clients 121A-C participate, while content item server 101B manages a content item in which content item clients 121D-F participate. In the particular example of FIG. 1, each content item server communicates with three respective content item clients, but it is noted that the techniques described herein may be employed with respect to any numbers of content item servers each communicating with any number of content item clients. In some examples, content item servers 101A-B may combine to manage a single instance of the same content item, may manage separate instances of the same content item, or may manage separate instances of different content items.

Content item servers 101A-B and content item clients 121A-F may combine to execute their respective content items. In particular, content item clients 121A-F may collect input data, such as character control input, for example from players that are playing a video game. This input data may be provided to content item servers 101A-B, which may use this input data to generate and update content server data 111A-F, which is data associated with a content item that is generated and/or maintained a content item server. As shown in FIG. 1, content server data 111A-F is transmitted from content item servers 101A-B to respective content item clients 121A-F. In some examples, the content server data 111A-F may include data that is used by content item clients 111A-F to render respective image data corresponding to respective views of the content item. The content server data 111A-F may include, for example, state data for the content item as well as graphics rendering information associated with the content item. In particular, state data includes data associated with a state of the content item and is described in detail below. Graphics rendering information may include information for rendering of the content item, such as object information, lighting, color, texture, shading, reflectivity, and other information.

Upon receiving content server data 111A-F, content item clients 121A-F may use content server data 111A-F to render respective views of the content item. For example, graphics rendering information included in the content server data 111A-F may be provided to graphics processing units (GPU's) and other processing components at content item clients 121A-F for rendering of the respective views. The rendered views include image data (e.g., video data), for example for display to players or other users operating the content item clients 121A-F. In addition to displaying this image data to users, content item clients 121A-F may also capture the image data included in these rendered views, for example using image and/or video capture software, and then transmit the image data to image data streaming service 140 via respective image data streams 131A-F. As described in detail below, image data streaming service 140 may generally make image data streams 131A-F available for transmission to and viewing by viewers 151A-N.

As shown in FIG. 1, in addition to image data streams 131A-F, content item clients 121A-F also provide respective state data streams 132A-F to image data streaming service 140. Generally, state data streams 132A-F each include state data associated with respective image data streams 131A-F, such as information that describes the contents of respective image data streams 131A-F. As set forth above, state data includes data associated with a state of the content item. In some examples, the state data in state data streams 132A-F may describe attributes such as game information (e.g., game name, game type, game server, player quantity), level, virtual location (e.g., coordinate values, name, ID, type), perspective (e.g., camera direction, pan, tilt), timing information, player information (e.g., player name, player ID, player class), team information, opponent information, battle or match information (e.g., match name, match ID, match type, match player quantity), kill information, hidden attributes (e.g., attributes that are not exposed to one or more players), and many other attributes. As will be described in detail below, in some examples, the state data may include one or more tags and/or name value pairs, for example that indicate values for attributes such as those listed above. Also, in some examples, the state data streams 132A-F may include positional data associated with characters, assets, and/or other virtual objects that may be included in image data streams 131A-F. For example, state data may indicate a displayed position of a character within one or more images, such as to allow a box to be drawn around the character or to allow the character to be otherwise highlighted or drawn to the attention of a viewer.

As described above, content server data 111A-F that is transmitted from content item servers 101A-B to content item clients 121A-F may include state data associated with a content item. Accordingly, in some examples, the state data included in content server data 111A-F may describe any or all of the example attributes identified above. In some examples, state data streams 132A-F may include some or all of the state data that is transmitted from content item servers 101A-B and included in content server data 111A-F. For example, in some cases, content item clients 121A-F may simply forward state data received from the content item servers 101A-B along to the image data streaming service 140 via state data streams 132A-F. In other examples, content item clients 121A-F may identify and extract certain portions of the state data received from the content item clients 101A-B and include those extracted portions in state data streams 132A-F. It is noted, however, that state data streams 132A-F need not necessarily include any or all of the exact state data that is transmitted from content item servers 101A-B and included in content server data 111A-F. For example, in some cases, state data streams 132A-F may include metadata or other data that is generated based, at least in part, on data from the content item servers 101A-B. For example, in some cases, state data streams 132A-F may include data formed by having content item server and/or client applications convert at least a portion of state data from the content item servers 101A-B into a format and/or protocol that is associated with and may be efficiently processed by image data streaming service 140.

Any or all of the state data in state data streams 132A-F may be updated to reflect changes in the content of the image data streams 131A-F as those changes occur. For example, when a player moves his character to change the character's virtual location in a game world, location information included in state data streams 132A-F may be updated to reflect this change. In some examples, in order to allow portions of state data in state data streams 132A-F to be efficiently matched to respective portions of image data in image data streams 131A-F, the streams 131A-F and 132A-F may each include timestamps, sequence numbers, and/or other order identification techniques. This may help to ensure that the state data in state data streams 132A-F can be matched to the respective portion of image data in image data streams 131A-F that the state data is intended to describe.

Upon receiving image data streams 131A-F and state data streams 132A-F, image data streaming service may make image data streams 131A-F available for transmission to viewers 151A-N. Image data streaming service 140 may also use state data streams 132A-F to provision image data streams 131A-F, for example in order to allow viewers 151A-N to select image data streams 131A-F that are of particular interest to viewers 151A-N for transmission thereto. For example, in some cases, a viewer 151A-N may select, via an interface provided by the image data streaming service 140, one or more attribute values that are of particular interest to the viewer, virtual locations, perspectives, levels, battle types, battle sizes, and many others. The viewer 151A-N may then be subscribed to these selected attribute values. The image data streaming service 140 may then monitor the received state data streams 132A-F to determine when one or more of the received image data streams 131A-F have attribute values that match the attribute values to which the viewer 151A-N is subscribed. Some examples of an interface for subscribing to various attributes are described in detail below with reference to FIGS. 5 and 6.

In another example, the image data streaming service 140 may provide an interface that indicates currently available image data streams 131A-F and their current respective attribute values as indicated by the state data stream 132A-F. Viewers 151A-N may then use this interface to browse available image data streams 131A-F and select one or more streams that are of particular interest to the viewers 151A-N. Some examples of an interface that indicates attribute values for currently available image data streams are described in detail below with reference to FIG. 7.

As yet another example, in some cases, when a particular image data stream 131A-F is being transmitted to a viewer 151A-N, the image data streaming service 140 may use state data streams 132A-F to identify one or more other image data streams that are related to the transmitted image data stream. For example, the image data streams may be related based on having at least partially similar state data, such as one or more matching or associated attribute values. For example, in some cases, the state data streams 132A-F may be used to identify additional views of a particular battle from different perspectives, such as perspectives associated with different players. The viewer 151A-N may then be presented with the option to receive and, in some cases, simultaneously view these additional image data streams. Some examples techniques for selecting and simultaneously viewing multiple related data streams are described in detail below with reference to FIGS. 8-9.

In the particular example of FIG. 1, viewer 151A receives image data stream 131C, viewer 151B receives image data streams 131A and 131B, and viewer 151N receives image data streams 131A and 131F. Thus, it is seen that the described techniques may allow a viewer to simultaneously receive multiple streams from the same content item instance (e.g., streams 131A and 131B received by viewer 151B). Additionally, for cases in which content item servers 101A-B execute different content items, streams 131A and 131F received by viewer 151N may include multiple streams from different content items. For cases in which a viewer receives multiple streams, various different options may be employed for viewing the multiple streams, such as using a split screen presentation, a periodically alternating stream presentation, or a picture-in-picture stream presentation. In some examples, when at least parts of multiple streams are displayed simultaneously, the presentation of the streams may be synchronized such that simultaneously occurring events from the different streams are presented simultaneously. In some examples, this may be accomplished by synchronizing timestamps, sequence numbers, or other order identification techniques such as may be included within image data streams 131A-F as described above.

Figure 2:
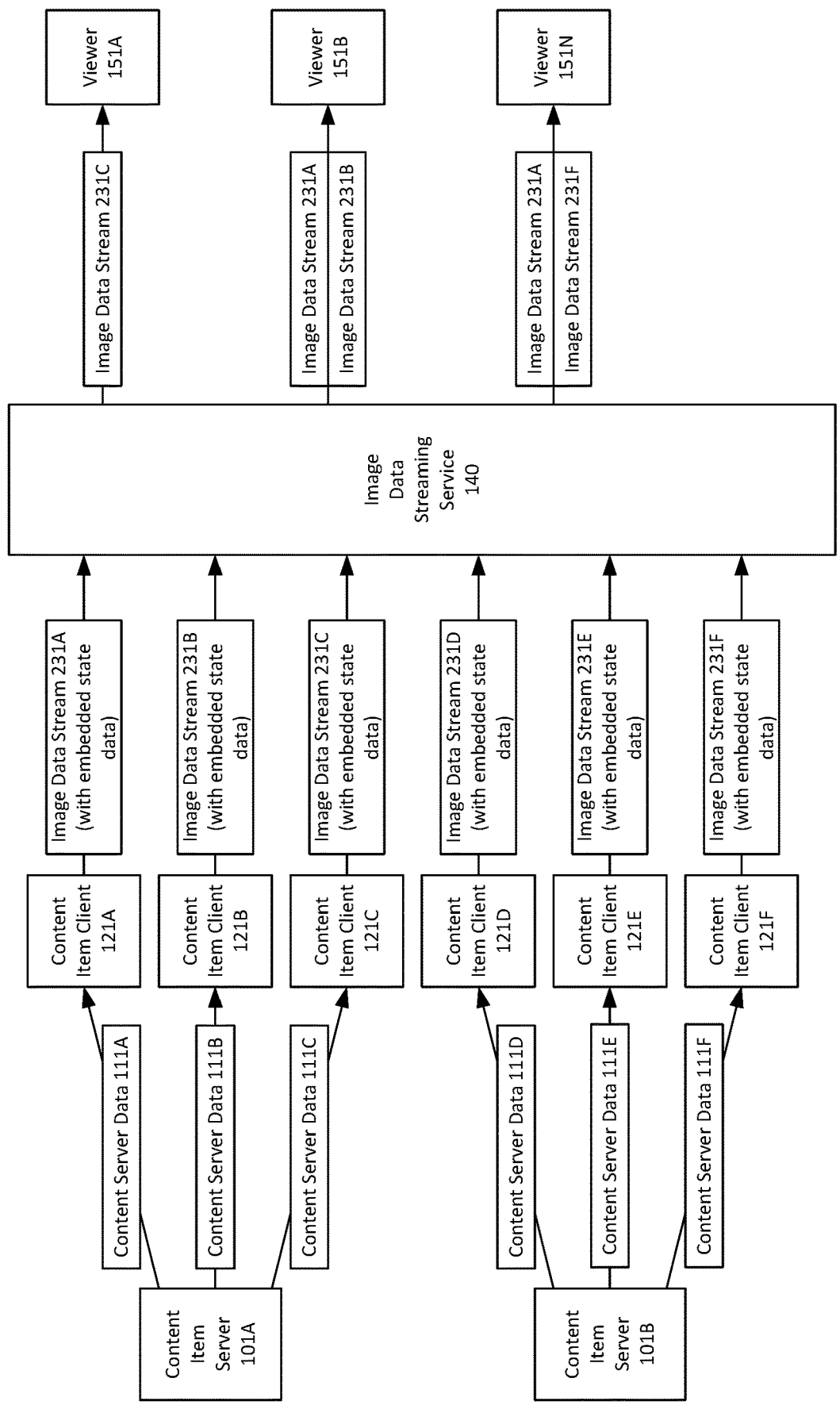
FIG. 2 is a diagram illustrating an example provisioning system with combined image data streams having embedded state data that may be used in accordance with the present disclosure.

Thus, as shown in FIG. 1, state data streams 132A-F may allow provisioning of image data streams 131A-F by image data streaming service 140. It is noted, however, that there is no requirement that state data must be provided to image data streaming service 140 using separate state data streams 132A-F. Rather, any appropriate technique may be employed for providing state data to image data streaming service 140. Referring now to FIG. 2, an example will be described in which state data is provided to image data streaming service 140 by embedding the state data within image data streams. In particular, in the example of FIG. 2, content item clients 121A-F do not send separate state data streams 132A-F to image data streaming service 140. Rather, in the example of FIG. 2, image data streams 231A-F include embedded state data associated with the image data streams 231A-F, such as state data that describes contents of the image data streams 231A-F. The state data embedded into image data streams 231A may include any of the same and/or different state data included in separate state data streams 132A-F, such as state data that describes any of the example attributes described above or other attributes. In some examples, a combination of the approaches shown in FIGS. 1 and 2 may be employed, in which some clients 121A-F send separate state data streams (as shown in FIG. 1) while other clients 121A-F send image data streams with embedded state data (as shown in FIG. 2).

In some examples, content item clients 121A-F may embed state data into a header for a respective portion of image data, such as a video coding header. Thus, for example, the state information in a header may include state information for the respective portion of image data to which the header applies. One advantage of this approach is that it may eliminate any need to include timestamp, sequence number, or other identification information in the state data. In some examples, to potentially reduce the amount of transmitted data, image data streaming service 140 may extract and remove embedded state data before transmitting the image data streams 231A-F to viewers 151A-N. In other examples, the state data may not be extracted and may remain in the image data streams 231A-F when transmitted to viewers 151A-N.

While FIGS. 1 and 2 depict examples in which state data is transmitted to image data streaming service 140 by content item clients 121A-F, it is noted that state data may additionally or alternatively be transmitted to image data streaming service 140 by content item servers 101A-B. In such cases, the state data received from the content item servers 101A-B may sometimes include identification information that allows image data streaming service 140 to match the received state data to the image data stream to which that state data applies. For example, content item server 101A may send state data regarding content item client 121A to image data streaming service 140 and may include information identifying this state data as applying to image data stream 131A that is received from client item client 121A. Additionally, regardless of its source, there is no requirement that state data must be sent as part of a stream of data, and, in some examples, state data may be provided only intermittently to image data streaming service via either streaming or non-streaming data transmission techniques.

It is further noted that, while FIGS. 1 and 2 depict examples in which the content item views are rendered at content item clients 121A-N, the techniques described herein may also be employed for use with server-rendered content items or partially server-rendered content items, sometimes referred to as hybrid content items. In these scenarios, the image data streams may be provided to the image data streaming service by the content item servers, the content item clients, or some combination of both.

Figure 3:
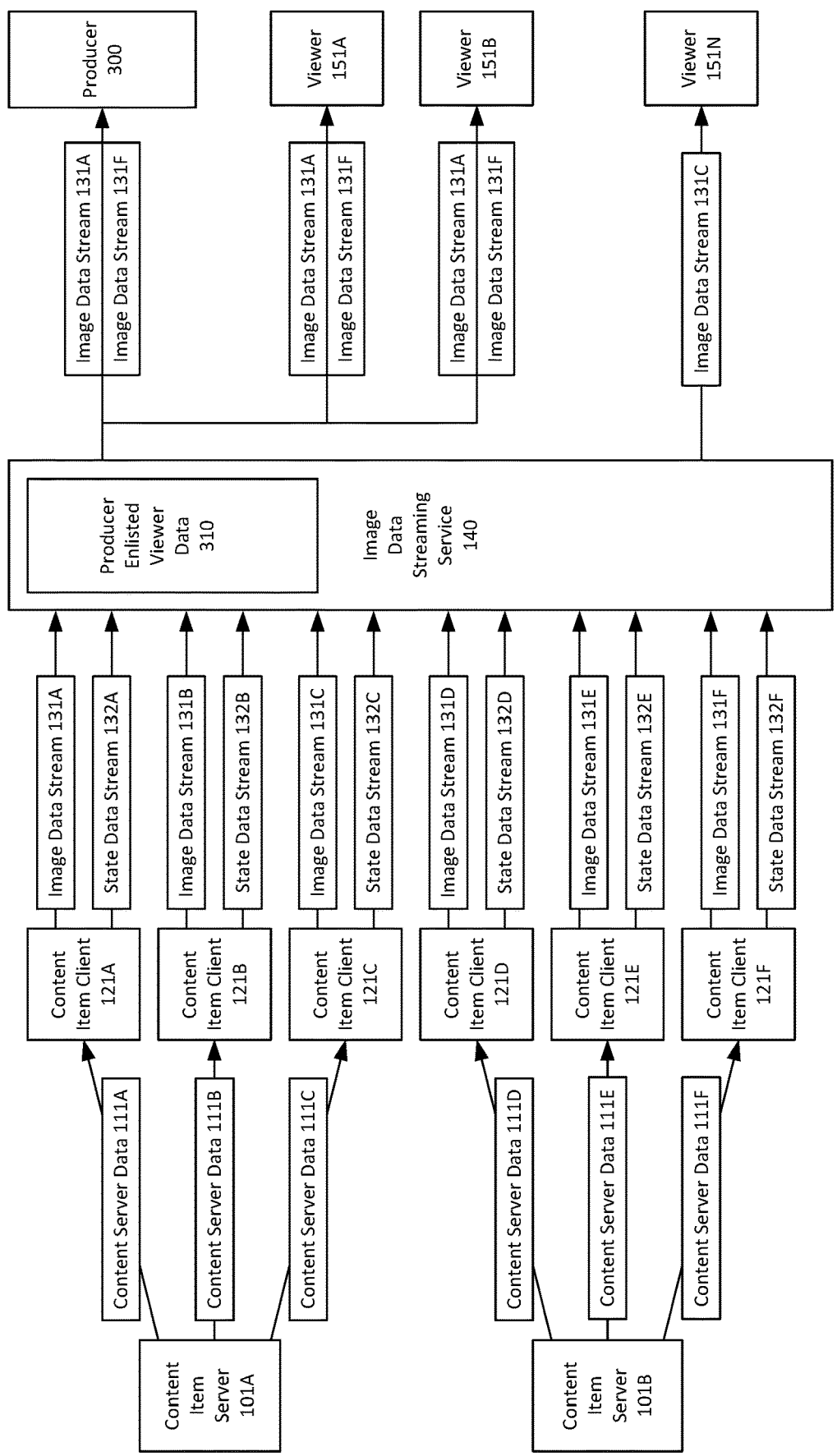
FIG. 3 is a diagram illustrating an example provisioning system with stream producers that may be used in accordance with the present disclosure.

In some examples, certain viewers may enlist themselves (or may otherwise be enlisted) to receive one or more video streams that are selected by other viewers and/or selectors, referred to hereinafter as producers. For example, producers may create image data stream channels that are subscribed to by other viewers. In some cases, when a producer's channel is subscribed to by other viewers, this may enhance the producer's popularity and reputation. In some examples, the producers may be humans, software components, or combinations of both. Referring now to FIG. 3, an example will be described in which state data is used by producers to select streams for transmission to the producers and their enlisted viewers. In the example of FIG. 3, image data streaming service 140 stores producer enlisted viewer data 310, which may identify producers and one or more viewers that are enlisted to receive image data streams selected by a respective producer. As shown in FIG. 3, producer 300 has used state data provided by image data streaming service 140 to select image data streams 131A and 131B for transmission to the producer 300. As also shown in FIG. 3, viewers 151A and 151B have enlisted to receive image data streams selected by producer 300. This is shown in FIG. 3 by having image data streams 131A and 131B also transmitted to viewers 151A and 151B. It is noted that, in some examples, an enlisted viewer need not necessarily receive each and every stream that is selected by a respective producer. For example, in some cases, upon selection of an image data stream by a producer, the producer's enlisted viewers may be provided with an option to receive or not receive the selected image data stream. Enlisted viewers may also sometimes be provided with the option to terminate stream delivery at a later time and/or to request transmission of additional image data streams. For example, enlisted viewers may sometimes be presented with an indication of other streams related to those selected by the producer and may be provided with options to request those related streams. As will be described in detail below, in some examples, producers (or possibly other authorized users) may sometimes be provided with specialized ability to request and receive certain state data. For example, in some cases, at least part of state data for one or more attributes may be restricted such that it is only made available to producers. As will also be described in detail below, in some examples, producers may be capable of creating their own specialized attributes and requesting state data associated with those attributes. For example, a producer may be able to combine certain attributes and/or attribute values and tag them with another attribute and/or attribute value, such as combining a "sword" attribute value and a "shield" attribute value to a more encompassing attribute value such as "medieval." Furthermore, in some examples, producers may be provided access to an software development kit (SDK) and/or other interfaces of the image data streaming service, for example for use in creating and defining their own specialized attributes. Also, in some examples, in addition to stream selection, a producer may be provided with other controls and interfaces with extended capabilities, such as adding visual effects, advertisements, and/or other features.

Figure 4:
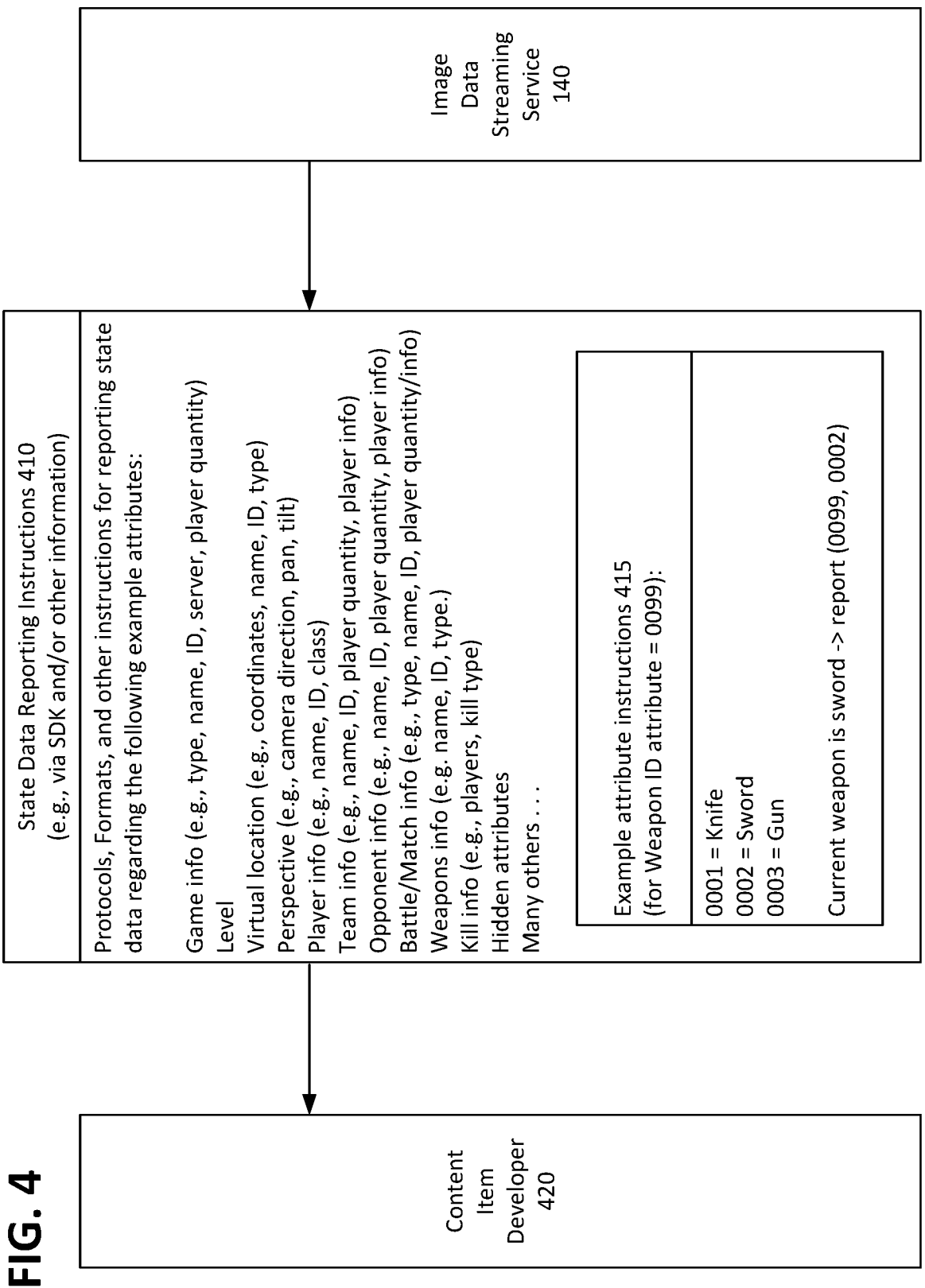
FIG. 4 is a diagram illustrating example exposure of state data reporting instructions that may be used in accordance with the present disclosure.

Thus, as set forth above, state data may be provided to image data streaming service 140 to enable efficient provisioning of image data streams. In some examples, image data streaming service 140 may expose or otherwise provide instructions that allow content item developers to design content items to collect and report state data in a manner that may be efficiently aggregated by image data streaming service 140. For example, in some cases, image data streaming service 140 may expose an SDK and/or other information that indicates attributes, protocols, formats, and/or other instructions for collection and reporting of content item state data. Referring now to FIG. 4, some examples of state data reporting instructions will now be described in detail. In particular, as shown in FIG. 4, image data streaming service exposes state data reporting instructions 410 to content item developer 420. It is noted that there is no requirement that image data streaming service must communicate state data reporting instructions 410 directly to content item developer 420. Rather, in some examples, content item developer 420 may obtain state data reporting instructions 410 from various other parties or communication sources, such as the Internet, hard copy publications, or other resources. There is also no requirement that state data reporting instructions 410 must be used by a content item developer. For example, in some cases, state data reporting instructions 410 may be implemented by a middleware developer to modify and/or provide add-ons to a content item. This may allow state data from the content item to be reported in accordance with state data reporting instructions 410 even when a content item developer has not explicitly designed the content item to do so.

As shown in FIG. 4, state data reporting instructions 410 indicates protocols, formats, and/or other instructions for reporting state data regarding various content item attributes. In the particular example of FIG. 4, these attributes include game information (e.g., game name, game type, game server, player quantity), level, virtual location (e.g., coordinate values, name, ID, type), perspective (e.g., camera direction, pan, tilt), player information (e.g., player name, player ID, player class), team information, opponent information, battle or match information (e.g., match name, match ID, match type, match player quantity/info), kill information, hidden attributes (e.g., attributes that are not exposed to one or more players), and others. In some examples, the attributes indicated by state data reporting instructions 410 may include custom attributes (e.g., attributes that are unique to particular content items, particular content item types, particular content items levels, etc.) as well as common attributes (e.g., attributes that are common to multiple different content items, content item types, content item levels, etc.). For example, some attributes, such as certain kill information, may be custom attributes that may be reported only for particular content items. By contrast, other attributes, such as virtual location coordinates, may be common attributes that may be reported for all (or almost all) content items. In some examples, state data reporting instructions 410 may provide a common format or protocol that allows common attributes from multiple different content items to be reported in the same or a similar fashion. This may be advantageous, for example, by allowing image data streaming service 140 to efficiently provision image data streams from multiple different content items, content item types, etc.

In some examples, state data reporting instructions 410 may indicate one or more tags or other attribute identifiers that allow the attributes and their values to be easily and efficiently identified and processed by image data streaming service 140. Also, state data reporting instructions 410 may indicate example identifiers or other information for representing various attributes. Furthermore, state data reporting instructions 410 may include instructions for associating a tag or other attribute identifier with its respective reported value, such as by using one or more name value pairs. To illustrate these concepts, example attribute instructions 415 of FIG. 4 include example instructions for reporting a Weapon ID attribute. As shown in FIG. 4, an example identifier of 0099 is indicated in instructions 415 to represent the Weapon ID attribute. Additionally, instructions 415 indicate some example value identifiers that are used to represent some example weapons. In particular, the identifier 0001 is used to represent a knife, the identifier 0002 is used to represent a sword, and the identifier 0003 is used to represent a gun. Instructions 415 also depict a particular example of how a current attribute value for the Weapon ID attribute may be reported. Specifically, if a respective player or character is currently in possession of a sword, then, in this example, the value of the weapons ID attribute may be reported to image data streaming service 140 using the name value pair (0099, 0002), which may indicate to image data streaming service 140 that a respective image data stream depicts a player or character with a sword.

It is noted that, in some examples, an attribute tag or value indicated by state data reporting instructions 410 may be different from an underlying attribute tag or value that is used within the underlying content item. In these examples, a developer or other party may sometimes include, for example within the content item or content item add-ons, instructions for converting an underlying attribute tag or value that is used in the underlying content item to a representative attribute tag or value that indicated by state data reporting instructions 410. This may, for example, allow state data associated with that attribute to be efficiently reported to the image data streaming service 140 even when the content item and the state data reporting instructions 410 do not employ exact matching attribute tags or values.

In some examples, state data reporting instructions such as those shown in FIG. 4 may be used to design content item server applications, content item client applications, or any combination of these or other applications. In some cases, state data reporting instructions may sometimes be provided to one or more content items after development and release of the content item. In particular, in some examples, an image data streaming service or another entity may communicate with one or more executing content items to identify and request information regarding various attributes during execution of the content items. In some cases, various users of a content item streaming service, such as stream producers, may be granted special permissions to define and request various attributes tags and attribute values. These user-defined attributes may be submitted, via the image streaming service, to one or more content items to request state information regarding those attributes from the content items.

Thus, instructions such as those described above may allow state data to be reported to an image data streaming service in an efficient manner. As set forth above, this state data may allow image data streams that are of particular interest to viewers to be selected and provided to those viewers. In some examples, in order to allow viewers to indicate their particular interests for image data streams, the image data streaming service may provide one or more interfaces that allow viewers to select and subscribe to various attributes. An example of such an interface will now be described in detail with reference to FIG. 5. In particular, as shown in FIG. 5, viewer attribute subscription interface 500 indicates a number of example image data stream attributes 510-516. Specifically, interface 500 includes game type attribute 510, location type attribute 511, battle size attribute 512, level attribute 513, weapons 514, battle type attribute 515 and battle participants attribute 516. As also shown in FIG. 5, each attribute 510-516 has a number of selectable attribute values. For example, game type attribute 510 has selectable attribute values football, racing, and combat. In the example of FIG. 5, each attribute value has a respective adjacent checkbox that may be used to select the attribute value for subscription. For example, in FIG. 5, for game type attribute 510, the combat attribute value is selected as indicated by the X shown in its respective adjacent checkbox. It is noted that the attributes and attribute values shown in FIG. 5 are merely examples and that many other different attributes and attribute values may be employed.

Upon selecting one or more desired attribute values, a viewer may select subscribe button 599 in the bottom right corner of interface 500. This may cause the viewer to be subscribed to the attribute values that are selected in interface 500. The image data streaming service may then monitor the received state data to determine when one or more of the received image data streams have attribute values that match one or more attribute values to which the viewer is subscribed. In the example of FIG. 5, interface 500 is also used to indicate to the viewer when one or more image data streams have attributes that match the viewer's subscribed attributes. In particular, currently available matching streams listing 520 indicates that there are currently three available image data streams (Stream X, Stream Y, and Stream Z) that match the attribute values to which the viewer is subscribed. The viewer may also use listing 520 to select one or more matching streams that the viewer wishes to receive from the image data streaming service. For example, in FIG. 5, the viewer has selected to receive Stream Y and Stream Z as indicated by the X shown in their respective adjacent checkboxes.

It is noted that interface 500 is merely intended as a non-limiting example interface and that many other types of interfaces for selecting and subscribing to attribute values may also be employed. In particular, in some examples, an interface may display available image data streams that only partially match (e.g., match values for some attributes but that do not match values for other attributes) or that otherwise differ from a viewer's subscription. Also, in some examples, an interface may include functionality to search for particular attributes and/or attribute values that are of particular interest to viewers, such as a text entry search field, voice recognition-activated search functionality, and/ or other searching techniques. Furthermore, in some examples, an interface may display streams that do not exactly match a subscribed attribute value but are within a certain threshold or are otherwise related to a subscribed attribute value.

In some examples, one or more viewers may be able to create multiple subscriptions, and the image data streaming service may store information indicating selected attribute values and/or image data streams that are associated with each of the different subscriptions. The storage of this information may allow viewers to easily return to and/or switch back and forth between multiple subscriptions without having to re-select the attribute values and/or image data streams associated with those subscriptions. Additionally, in some examples, an image data streaming service may, upon authorization from a respective viewer, share the respective viewer's multiple subscriptions and their associated information with the first viewer and any number of other viewers. Furthermore, in some examples, viewers may, at any time, edit or modify the stored image data attribute values and/or selected image data streams associated with each subscription.

As set forth above, in some examples, certain users, such as producers, may have special privileges to define, request, view, and select state data for certain attributes. For example, in some cases, at least part of state data associated with one or more attributes may be exposed only to one or more producers and not exposed to other viewers. Referring now to FIG. 6, an example of a producer-only attribute will now be described in detail. In particular, FIG. 6 shows an example producer attribute subscription interface 600, which is similar to interface 500 of FIG. 5 with the exception that interface 600 includes a producer-only attribute 517 that is not included in interface 500. Specifically, producer-only attribute 517 is a kill type attribute with selectable attribute values including extreme, weapon, and hand-to-hand. In the example of FIG. 6, for kill type attribute 517, the extreme attribute value is selected as indicated by the X shown in its respective adjacent checkbox. As described above, in some examples, producer-only attribute 517 may sometimes be defined and requested by a particular producer, in some cases even for content items that have already been developed and distributed and that may be currently executing. Additionally, a producer may sometimes have access to an image data streaming service SDK, and producer-only attributes may be defined using the image data streaming service SDK. In some examples, a producer-only attribute may be defined based, at least in part, on combinations of two or more other attributes. For example, the kill type attribute 517 may sometimes be defined based on other attributes that indicate the presence of fire, explosions, blood, dismemberment, or other conditions. For example, a producer may define the extreme value for the kill type attribute as a kill that occurs in association with any combination of fire, explosions, blood, dismemberment, and other conditions, such as may be indicated by their respective attributes. In some examples, content item client applications and/or other components may then combine these attributes to populate the kill type attribute as defined by the producer. In some examples, the producer may have an associated channel, to which any number of viewers may subscribe. Also, in some examples, a producer's channel may be displayed in (or accessible from) any of the interfaces provided by the image data streaming service, such as any of the interfaces shown in FIGS. 5-7. Additionally, any of these or other interfaces may also be used by viewers to subscribe to the producer's channel. The producer's channel may include one or more streams selected by the producer as well as other features, such as added visual effects, advertising, and others. For example, in some cases, a producer may select four particular image data streams for inclusion in his channel, as well as a format for displaying the four selected image data streams, such as a split screen, alternating stream view, picture-in-picture, and others. The producer may also select to display advertising or other notifications, for example in a scroll bar along an edge (e.g., top, bottom, side) of the channel display. In some examples, the producer can perform selection and curation in real time or near-real time, for example like a conductor would select and control instruments in a symphony. For example, at any time during broadcast of the producer's channel, the producer may select a fifth stream to be added to his broadcast, and the fifth stream may then be instantaneously or nearly-instantaneously added to the producer's channel.

Figure 7:
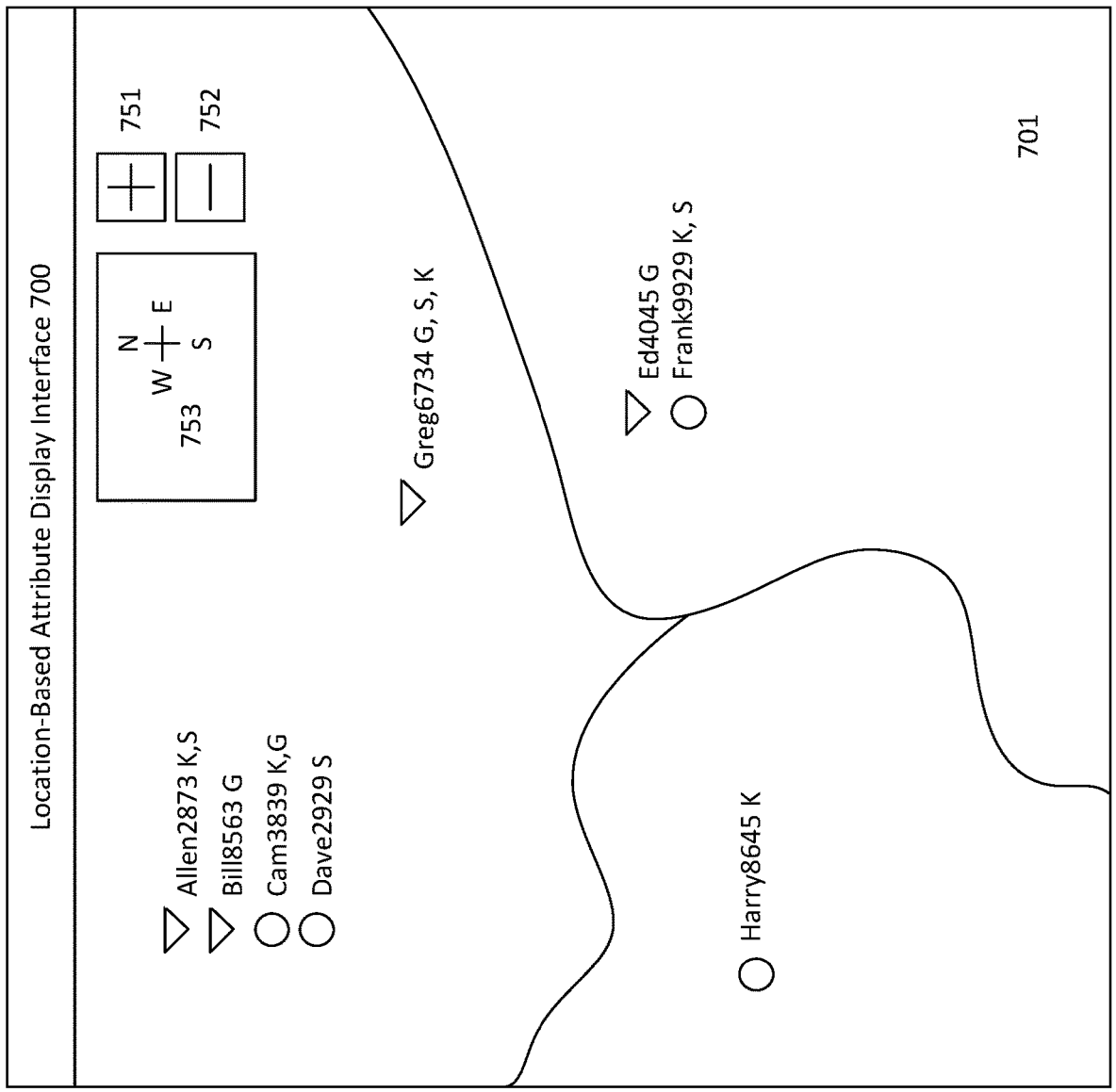
FIG. 7 is a diagram illustrating an example location-based attribute display interface that may be used in accordance with the present disclosure.

While FIGS. 5-6 depict interfaces that include a listing of attributes and attribute values, many other types of interfaces may also be employed to provide information to viewers regarding attribute values of currently available image data streams. Referring now to FIG. 7, another example of such interfaces will now be described in detail. In particular, FIG. 7 depicts an example location-based attribute display interface 700, which displays a map 701 (or other location-based representation) of at least part of a virtual area associated with a content item, such as a virtual world associated with a video game. As shown, zoom-in control 751 and zoom-out control 752 allow scaling of map 701, while directional control 753 allows directional movement throughout the virtual area represented by map 701. As should be appreciated, any number of additional or alternative controls or options may be provided for manipulation of map 701. As shown in FIG. 7, interface 700 shows, via map 701, the location of various players (e.g., Allen 2873, Bill 8563, Cam3839, Dave2929, Ed4045, Frank9929, Greg6734, Harry8645) within the virtual area. In some examples, displaying multiple player names adjacent to one another (e.g., Allen 2873, Bill 8563, Cam3839, Dave2929) may indicate that those players are participating together in a particular battle or match. In addition to player locations, interface 700 may also indicate other player attribute values. For example, a shape (e.g., triangle or circle) displayed to the left of each player name may indicate that player's team. In this example, one team is represented by the circle shape, while a competing team is represented by the triangle shape. In another example, different shapes could be used to represent different attributes, such as types or classes of players (e.g., wizards, generals, pirates, samurais, etc.) and others. Additionally, in the example of FIG. 7, one or more letters (e.g., K, S, and/or G) are displayed to the right of each player's name. In this example, these letters represent which types of weapons a player may possess, with K representing a knife, S representing a sword, and G representing a gun. As should be appreciated, the interface of FIG. 7 is merely a non-limiting example, and any number of other interfaces using any number of other different representations of attribute values may also be employed. For example, some map interfaces may include representations of images and video displayed in the image data streams of the various players, such as adjacent to the locations of the players. In particular, in some cases, a thumbnail or other container may be displayed adjacent to each player's location that presents images and/or video from the player's respective image data stream. In some examples, the thumbnails or containers may be presented and/or enlarged when a viewer hovers over (or otherwise selects) the player's location within the map interface. In some examples, when a viewer wishes to request and receive one or more image data streams for one or more of the players shown in map 701, the viewer may click on (or otherwise select) the names of the players whose streams the viewer wishes to receive. The image data streaming service may then transmit the requested streams to the viewer.

In some examples, content item developers or other parties may provide information to image data streaming service that describes a virtual area associated with a particular content item. This may assist the image data streaming service with generating and/or updating of the map 701. Also, the map 701 may also be generated and/or updated based, at least in part, on state data sent to the image data streaming service from the executing content item. For example, player locations and other attribute values may be updated based on the state data. Also, in some examples, the image data streams that are transmitted to the image data streaming service may also be used to generate and/or update the map 701. For example, in some cases, image data from the image data streaming service may be used to create graphical depictions of various portions of the virtual area within map 701. For example, in some cases, map 701 may include graphical depictions of various cities, buildings, mountains, oceans, and other objects or features included within the virtual area of the content item.

Figure 8:
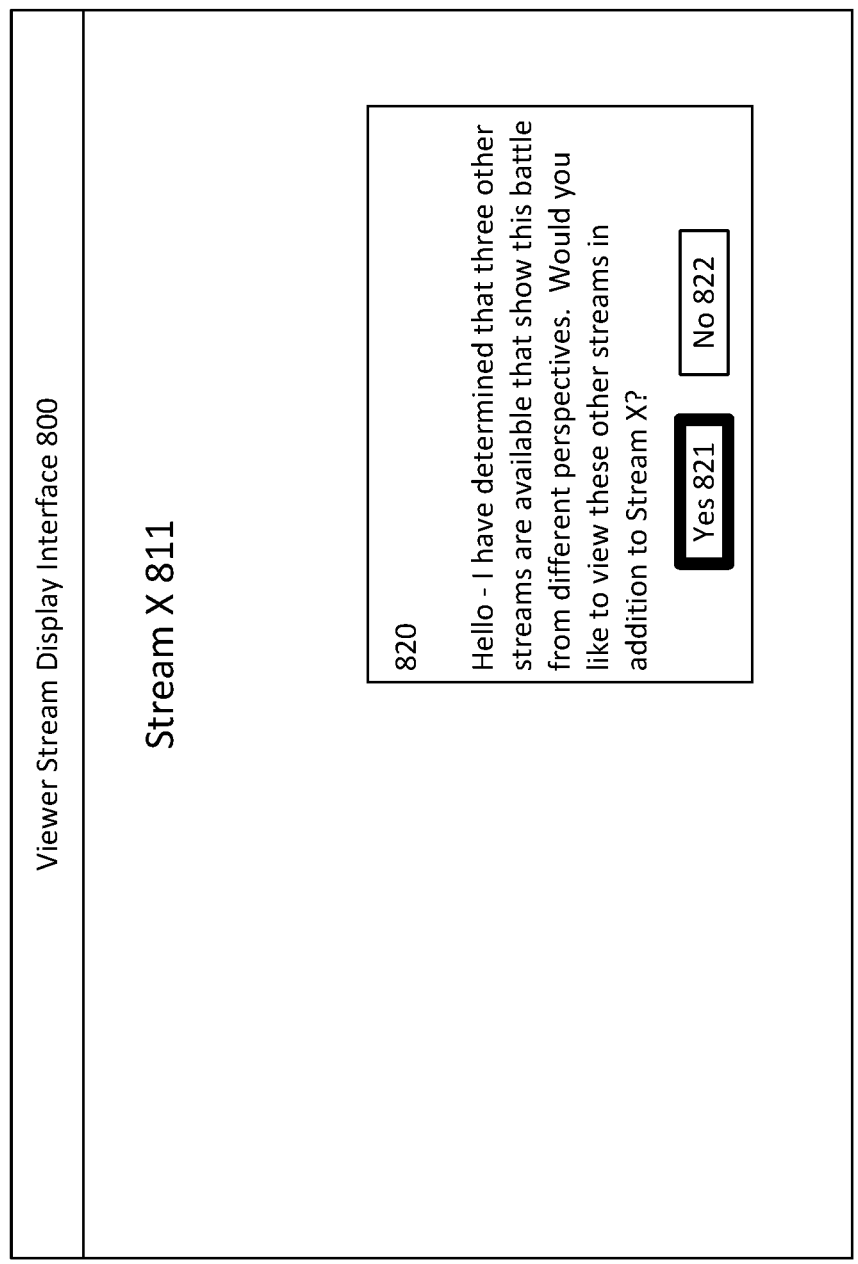
FIG. 8 is a diagram illustrating an example related stream request interface that may be used in accordance with the present disclosure.

Thus, FIG. 7 provides an example of a location-based stream selection interface. In some examples, when a viewer is receiving and viewing a particular image data stream, it may sometimes be advantageous to identify one or more other related image data streams and to allow the user to request and receive these other related an image data streams. For example, the image data streams may be related based on having at least partially similar state data, such as one or more matching or associated attribute values. Some examples of interfaces for requesting and receiving multiple related image data streams will now be described in detail with reference to FIGS. 8 and 9. In particular, referring now to FIG. 8, it is seen that a particular image data stream (Stream X in this example) is being displayed to a viewer in a stream display area 811 of a viewer stream display interface 800. As also shown in FIG. 8, at some point during the display of Stream X, a pop-up box 820 is also displayed to the user within area 811. In particular, the pop-up box 820 indicates that it has been determined that that there are three other streams available that show a battle being displayed in Stream X from different perspectives. As described above, this determination may be made by an image data streaming service based, at least in part, on state data provided to the image data streaming service for Stream X and the related streams indicating that the streams all depict the same battle. Pop-up box 820 also asks the viewer whether the viewer would you like to view these other streams in addition to Stream X. In the example of FIG. 8, the viewer may request to view the other streams by selecting Yes button 821 or may deny the request by selecting No button 822. In the example of FIG. 8, the viewer has selected to view the other streams, as indicated by the thick black line surrounding Yes button 821 that indicates selection of that button. In some examples, in addition or as an alternative to pop-up box 820, other indications of related available image data streams may also be provided. For example, in some cases, thumbnails or other containers may be provided to show images and/or video from the related image data streams. In one specific example, interface 800 may include a field that displays scrolling text, images, and/or video that indicates one or more related image data streams and/or their respective contents.

Figure 9:
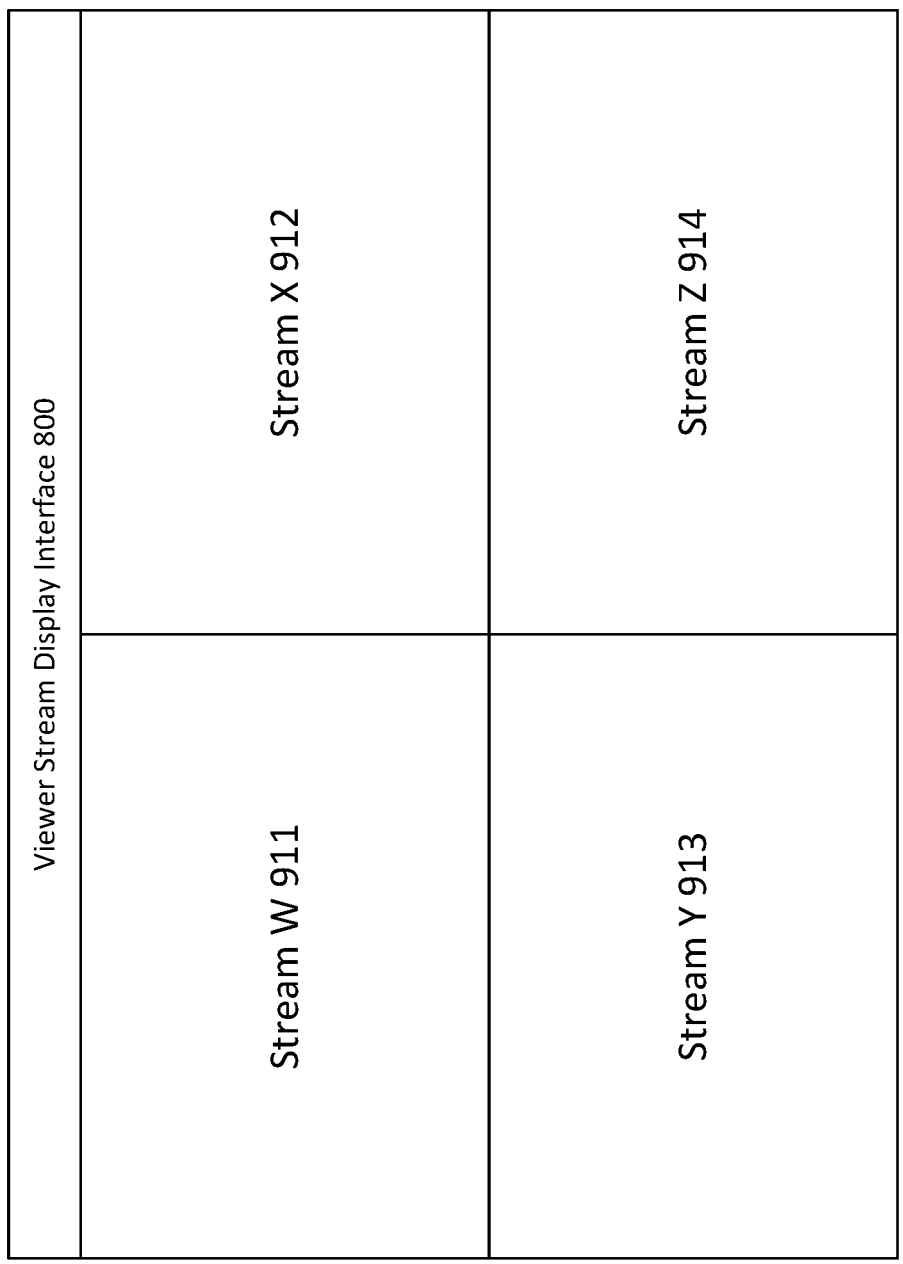
FIG. 9 is a diagram illustrating an example related stream display interface that may be used in accordance with the present disclosure.

Referring now to FIG. 9, it is seen that selection of Yes button 821 has caused the viewer stream display interface 800 to spilt into four different split-screen viewing areas 911-914 for display of Stream X and related Streams W, Y and Z. In particular, Stream W is displayed in top-left viewing area 911, Stream X is displayed in top-right viewing area 912, Stream Y is displayed in bottom-left viewing area 913, and Stream Z is displayed in bottom-right viewing area 914. Thus, the split-screen display of FIG. 9 allows a viewer to see four image data streams that show the same battle from four different perspectives (e.g., different or partially different locations, angles, directions, pans, tilts, etc.). For example, in some cases, each stream may show the battle from a perspective associated with a respective player or character operated by a content item client that generates the respective steam (e.g., with the respective player in the center of the view, showing scene as viewed by the respective player, etc.). In some examples, the presentation of Streams W, X, Y and Z may be synchronized such that simultaneously occurring events from the different streams are presented simultaneously. In some examples, this may be accomplished by synchronizing timestamps, sequence numbers, or other order identification techniques such as may be included within image data streams 131A-F as described above. For example, in some cases, one or more clients or other viewer devices may examine timestamps in received image data streams 131A-F and use the timestamps to synchronize the presentation of the image data streams 131A-F, for example such that portions of image data in different streams having associated timestamps are displayed simultaneously. Also, in some cases, a transmitting server may assist in such synchronization, for example by examining timestamps in the different image data streams 131A-F and using the timestamps to synchronize or nearly-synchronize transmission of portions of the image data streams 131A-F having associated timestamps. It is noted that, while the particular example of FIG. 9 employs split-screen functionality, many other screen presentation techniques may be employed for display of Streams W, X, Y and Z, such as a periodically alternating stream presentation, or a picture-in-picture stream presentation, and others.

Figure 10:
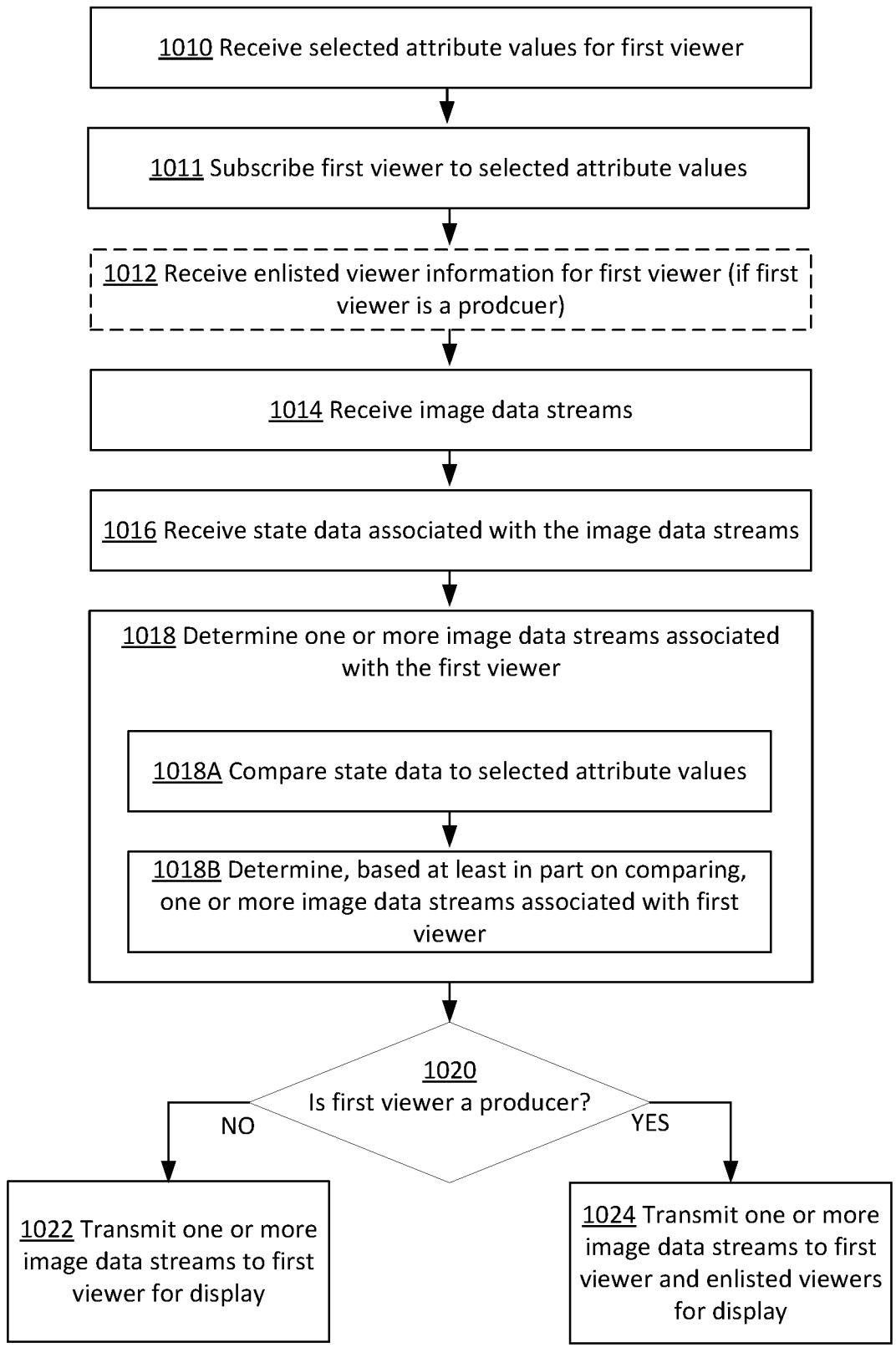
FIG. 10 is a flowchart illustrating an example subscription-based image data stream provisioning process that may be used in accordance with the present disclosure.

A number of example processes for image data stream provisioning will now be described in detail with reference to FIGS. 10-12. In some examples, the processes of FIGS. 10-12 may be performed by an image data streaming service, which may expose state data reporting instructions based, at least in part, upon which state data may be generated by one or more content items. Some examples of these state data reporting instructions are described in detail above with reference to FIG. 4. The state data reporting instructions may indicate formats and/or protocols for at least part of the state data. As also set forth above, in some examples, any or all of these state data reporting instructions may be included in an SDK associated with the image data streaming service. In particular, FIG. 10 depicts an example process for subscription-based image data stream provisioning. As shown, the process of FIG. 10 begins with operation 1010, at which one or more selected attribute values for the first viewer are received. As set forth above, the selected attribute values may include attribute values that are selected by the first viewer and that are of particular interest to the first viewer. As also set forth above, the selected attribute values may be for attributes that describe contents of image data streams captured from one or more content items and made available for streaming by an image data streaming service. In some examples, the first viewer may select and subscribe to attribute values using an interface provided by an image data streaming service that indicates various attributes and allows selection of attribute values, such as attribute subscription interface 500 of FIGS. 5 and 6.

At operation 1011, the first viewer is subscribed to the selected attribute values. For example, a first viewer may trigger subscription to the selected attribute values by selecting subscribe button 599 of FIGS. 5 and 6 or via other suitable techniques. As set forth above, when a viewer is subscribed to one or more attribute values, an image data streaming service may identify one or more image data streams associated with the subscribed attribute values for transmission to the viewer. This process is described in with reference to operation 1018 below.

At operation 1012, enlisted viewer information is received for the first viewer (if the first viewer is a producer). As set forth above, a producer is a special viewer to which one or more other viewers may enlist and/or subscribe for the purpose of receiving (or having the option to receive) one or more image data streams associated with (e.g., selected by or for) the producer. Accordingly, if the first viewer is a producer, the information received at operation 1012 may include information registering or otherwise identifying the first user as a producer as well as information indicating one or more other viewers that are enlisted and/or subscribed to receive streams selected by or for the first viewer.

At operation 1014, image data (e.g., video) streams are received, for example by an image data streaming service. As set forth above, the image data streams received at operation 1014 may be captured from one or more content items. For example, content item clients may include image data (e.g., video) capture software that captures image data rendered by the content item clients. The content item clients may then transmit the captured image data streams to an image data streaming service, for example as shown in FIGS. 1-3. Also, in some examples, one or more image data streams may be captured by a content item server and transmitted to the image data streaming service from the content item server.

At operation 1016, state data associated with the image data streams is received for example by an image data streaming service. For example, the state data received at operation 106 may describe contents of the image data streams. As set forth above, in some examples, the state data may be generated by one or more content items, and, in particular, one or content item server applications, one or more content item client applications, or both. The state data may also be transmitted to an image data streaming service from one or more content item servers, one or more content item clients, or both. In some examples, the state data may be transmitted using state data streams that are associated with the image data streams. For example, as shown in FIG. 1, one or more image data streams may have a respective state data stream that is transmitted to the image data streaming service. Also, in some examples, such as shown in FIG. 2, one or more image data streams may have respective state data embedded into the image data streams, such as by being included in headers and/or other areas of the image data streams. In some examples, the state data may indicate values of attributes associated with the one or more image data streams. These may include attributes such as game information (e.g., game name, game type, game server, player quantity), level, virtual location (e.g., coordinate values, name, identifier (ID), type), perspective (e.g., camera direction, pan, tilt), timing information, player/character information (e.g., player/character name, player/character ID, player/character class), team information, opponent information, battle or match information (e.g., match name, match ID, match type, match participants, match player quantity), kill information, hidden attributes (e.g., attributes that are not exposed to one or more players), and many other attributes. The state data may, for example, include metadata (and/or other data) expressed using formats and/or protocols associated with an image data streaming service. In some examples, the state data may include one or more name value pairs, for example that indicate attributes and their respective values. Also, in some examples, the state data may be updated to reflect changes in the content of the image data streams as those changes occur.

At operation 1018, one or more image data streams associated with the first viewer are determined. As set forth above, the one or more image data streams may be associated with the first viewer based at least in part on the state data received at operation 1116. In particular, in this example, operation 1018 includes sub-operations 1018A and 1018B. Specifically, at sub-operation 1018A, the state data received at operation 1016 is compared to the selected attributes to which the first viewer is subscribed (i.e., the selected attributes received at operation 1010) to determine one or more image data streams associated with the first viewer. For example, in some cases, an image data stream may be associated with the first viewer by at least partially matching one or more attribute values for the image data stream (as indicated by respective state data) with one or more of the selected attribute values to which the first viewer is subscribed. At sub-operation 1018B, one or more image data streams associated with the first viewer are determined based, at least in part, on the comparing performed at sub-operation 1018A. As set forth above, in some examples, image data streams may be associated with a viewer even when the image data streams only partially match (e.g., match values for some attributes but that do not match values for other attributes) or otherwise differ from a viewer's subscription. Also, in some examples, image data streams may be associated with a viewer even when their attribute values do not exactly match a subscribed attribute value but are within a certain threshold or are otherwise related to a subscribed attribute value.

At operation 1020, it is determined whether the first viewer is a producer, for example based on enlisted viewer information for the first requestor that may (optionally) be received at operation 1012. If the first viewer is not a producer, then, at operation 1022, the one or more associated image data streams are transmitted to the first viewer for display. By contrast, if the first viewer is a producer, then, at operation 1024, the one or more associated image data streams are transmitted to the first viewer and the first viewer's enlisted and/or subscribed viewers for display. It is noted that, in some examples, indications of the one or more associated image data streams may be presented to the first viewer and/or his enlisted and/or subscribed viewers, with options to either accept or decline transmissions of any of the one or more associated image data streams. Accordingly, in some examples, operations 1022 and/or 1024 may be omitted, for example when transmission of the one or more associated image data streams is declined either by the first viewer, enlisted and/or subscribed viewers, or both. It is also noted that, for cases in which multiple image data streams are transmitted, their transmissions may be time synchronized and/or presented using split-screen, alternating stream, picture-in-picture or other multi-stream presentation techniques.

Figure 11:
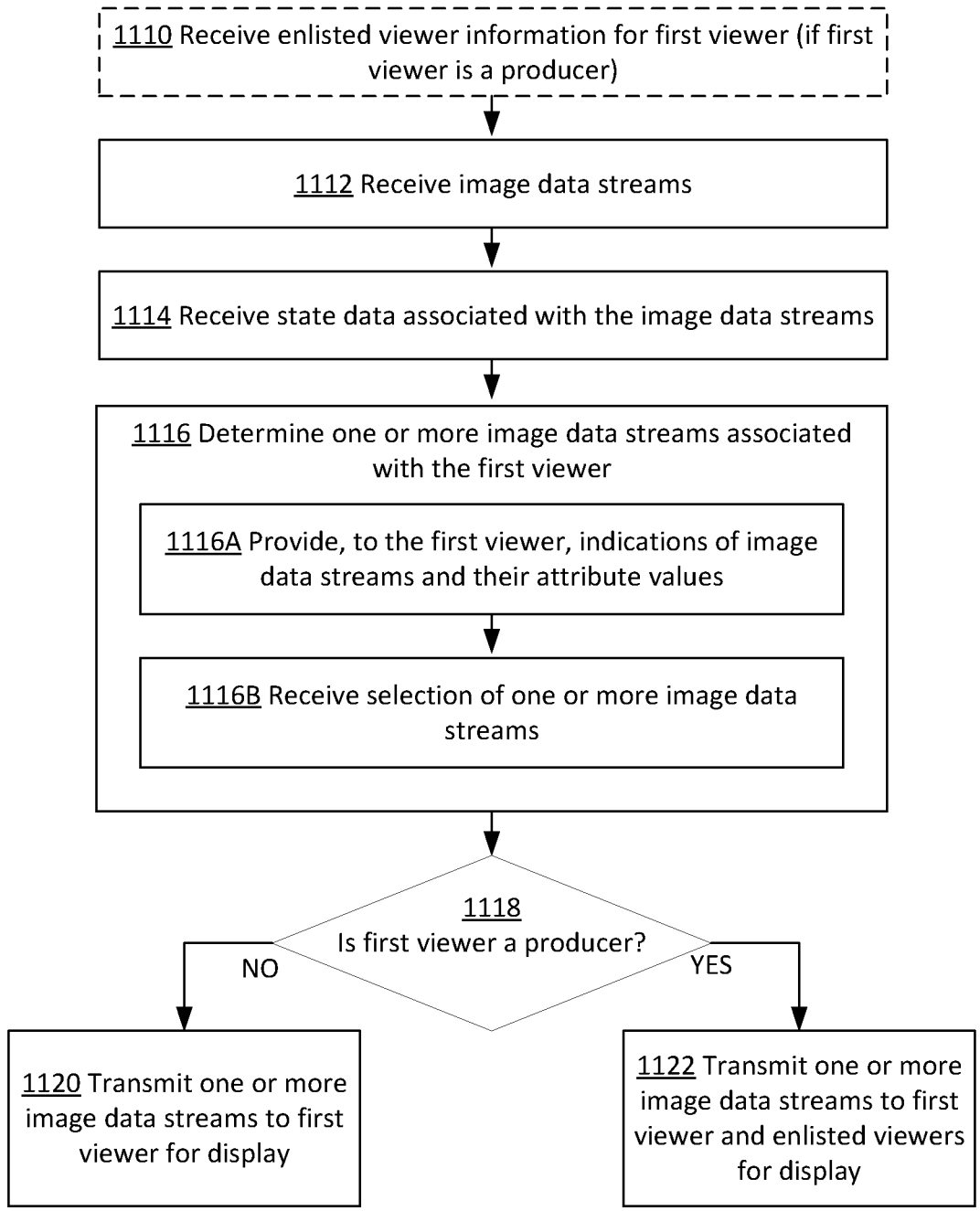
FIG. 11 is a flowchart illustrating an example stream selection-based image data stream provisioning process that may be used in accordance with the present disclosure.

Referring now to FIG. 11, an example stream selection-based image data stream provisioning process will now be described. In particular, the process of FIG. 11 describes an example in which viewers may select to receive particular image data streams without necessarily being subscribed to any attribute values. As shown, the process of FIG. 11 beings at operation 1110, at which enlisted and/or subscribed viewer information is received for the first viewer (if the first viewer is a producer). This operation is described previously with respect to operation 1012 of FIG. 10, and will not be repeated here. Additionally, operation 1112 (receiving image data streams) and operation 1114 (receiving state data associated with the image data streams) are described previously with respect to operation 1014 and 1016 of FIG. 10, and will also not be repeated here.

At operation 1116, one or more image data streams associated with the first viewer are determined. As set forth above, the one or more image data streams may be associated with the first viewer based at least in part on the state data received at operation 1116. In particular, in this example, operation 1116 includes sub-operations 1116A and 1116B. Specifically, at sub-operation 1116A, indications of image data streams and their respective attribute values are provided to the first viewer. As set forth above, attribute values for the image data streams may be determined based the state data received at operation 1116. In some examples, an image data streaming service may provide an interface that indicates the image data streams and their respective attribute values, such as the interface shown in FIG. 7. For example, an image data streaming service may provide the first viewer with access to a user interface that includes one or more visual representations of the state data. Specifically, FIG. 7 depicts a location-based interface including a map of a virtual area of one or more content items. The map indicates virtual locations as well as other attribute values for different image data streams and their associated players. As set forth above, a map interface such as shown in FIG.

7 may, in some cases, include graphical depictions of one or more virtual locations or virtual objects, for example generated based, at least in part, on one or image data streams. It is noted that, while FIG. 7 depicts a location-based interface, many other types of interfaces based on many other attributes may be used to indicate image data stream attribute values. At sub-operation 1116B, a selection of one or more image data streams for transmission is received. The one or more image data streams may be selected based at least in part on the associated state data. For example, as set forth above, a viewer may use an interface such as shown in FIG. 7 to select image data streams, for example by clicking on or otherwise selected names and/or icons corresponding to the streams. As should be appreciated, when the first viewer selects the one or more image data streams, a determination may be made that the selected one or more image data streams are associated with the first viewer. After operation 1116, the process of FIG. 11 concludes with operations 1118-1122, which are described previously with respect to operations 1020-1024 of FIG. 10, and will also not be repeated here. It is noted that, in some examples, a producer may not necessarily receive and/or view any transmitted image data streams, such as when a producer is software component. Thus, in some examples, the first viewer referred to in the processes FIGS. 10 and 11 may instead be a first selector, which may include both viewing and/or non-viewing producers. For example, enlisted and/or subscribed viewer information may be received for a first selector (e.g., at operations 1012 and 1110). A selection may also be received, from the first selector, of one or more image data streams based at least in part on the state data. If the first selector is a viewing producer (e.g., a human), then selected image data streams may be transmitted to the first selector as well as his or her enlisted and/or subscribed viewers. By contrast, if the first selector is a non-viewing producer (e.g., a software component), then selected image data streams may be transmitted to the first selector's enlisted and/or subscribed viewers without being transmitted to the first selector.

Figure 12:
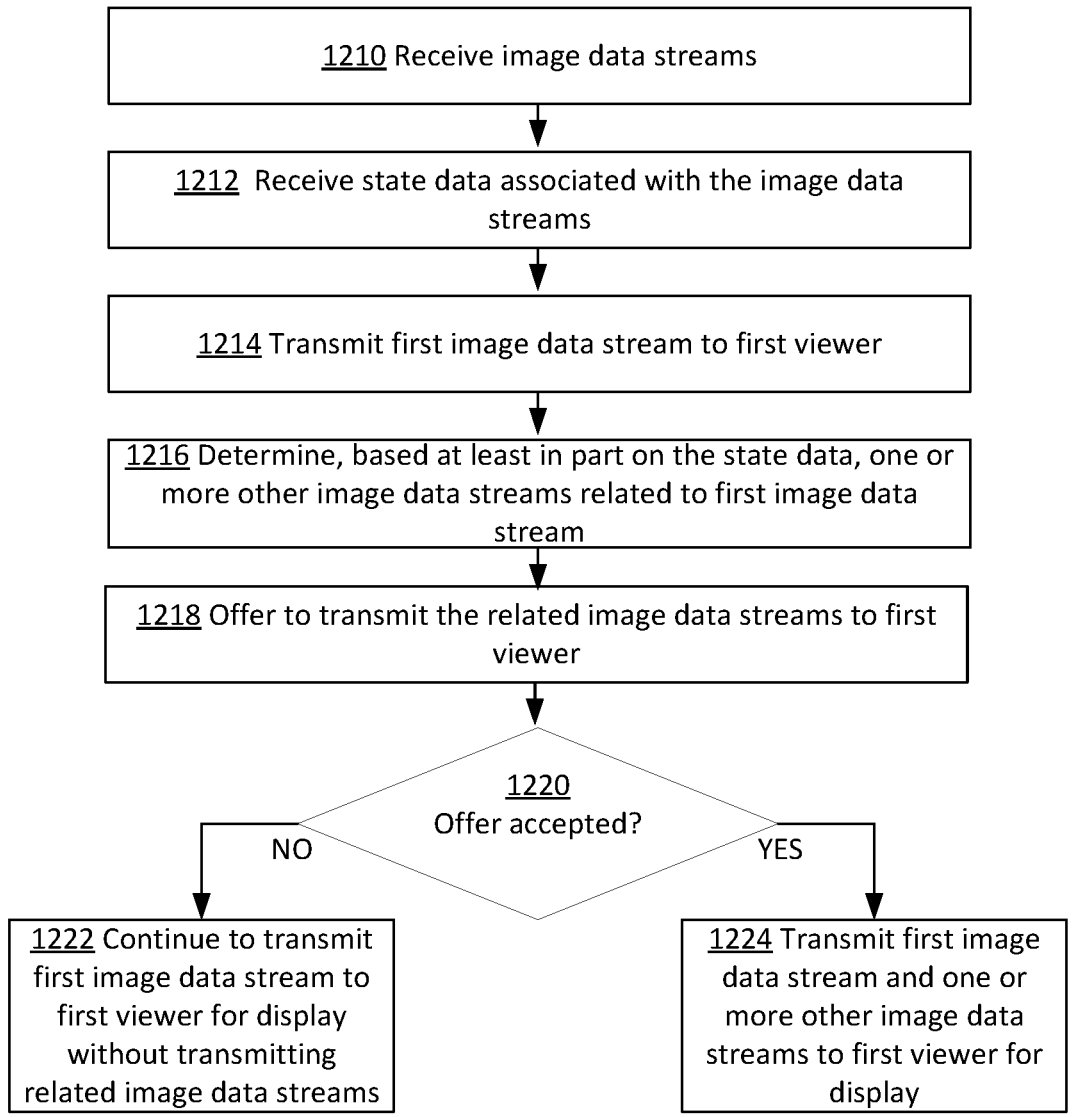
FIG. 12 is a flowchart illustrating an example related attribute-based image data stream provisioning process that may be used in accordance with the present disclosure.

Referring now to FIG. 12, an example related attribute-based image data stream provisioning process will now be described. As shown, the process of FIG. 12 beings with operation 1210 (receiving image data streams) and operation 1212 (receiving state data associated with the image data streams), which are described previously with respect to operations 1014 and 1016 of FIG. 10 and are not repeated here. At operation 1214, a first image data stream is transmitted to a first viewer, for example as shown in FIG. 8. The first image data stream may be selected for transmission to the first viewer using any of the provisioning techniques described herein, such as those described in FIGS. 10 and 11. At operation 1216, one or more other image data streams related to the first image stream are determined based, at least in part, on the state data received at operation 1212. For example, as set forth above, the image data streams may be determined to be related based on having at least partially similar state data, such as one or more matching or associated attribute values. For example, in some cases, if the first image data stream shows a particular battle, match, or location, the one or more other image data streams may show the particular battle, match, or location from one or more different perspectives (e.g., different or partially different locations, angles, directions, pans, tilts, etc.) than the first image data stream. For example, in some cases, each image data stream may show a match from a perspective associated with a respective player or character operated by a content item client that generates the respective steam (e.g., with the respective player in the center of the view, showing scene as viewed by the respective player, etc.). As set forth above, the one or more other image data streams that are related to the first image data stream may be determined by matching or partially matching one or more attribute values (e.g., location, match, battle, etc.) of the one or more other image data streams to one or more attribute values of the first image data stream At operation 1218, the one or more related image data streams may be offered for transmission to the first viewer, for example using an interface component such as pop-up box 820 of FIG. 8. At operation 1220, it is determined whether the offer at operation 1218 is accepted. If the first viewer rejects the offer, then at operation 1222, the first image data stream may continue to be transmitted to the first viewer for display without transmitting the one or more other image data streams. By contrast, if the first viewer accepts the offer for at least one of the related image data streams, then the first image data stream and one or more accepted related image data are transmitted to the first viewer for display at operation 1224. As set forth above, in some examples, at least parts of the first and related image data streams may be presented simultaneously to the first viewer. Additionally, in some examples, at least part of the presentation of first and related image data streams may be synchronized such that simultaneously occurring events from the different streams are presented simultaneously. In some examples, this may be accomplished by synchronizing timestamps, sequence numbers, or other order identifiers from the first and related image data streams. FIG. 9 depicts an example in which related streams are simultaneously presented using split-screen functionality. Additionally, many other screen presentation techniques may be employed for display of related streams, such as a periodically alternating stream presentation, or a picture-in-picture stream presentation, and others.

Thus, some example image data stream provisioning processes are described above with reference to FIGS. 10-12. It is noted that the techniques described herein may also be employed to search, identify, and retrieve various recorded image data streams and/or portions thereof that may be of particular interest to viewers, such as may be used for on-demand or other recorded stream playback applications. In particular, in some examples, in addition to storing at least part of the image data from the image data streams, an image data streaming service may also store at least part of the received state data that describes the contents of or that is otherwise associated with the recorded image data streams. This recorded state data may then be searched to identify attribute values that may match a viewer request. For example, a viewer may request to receive image data generated during a specified time period that took place at a particular virtual location, include particular teams or characters, include particular weapons, or is associated with other requested attribute values. The recorded state data may then be searched to identify portions of the recorded state data indicating the requested attribute values. Portions of recorded image data that correspond to the identified portions of recorded state data may then be retrieved and transmitted to the viewer. In some examples, recorded portions of image data may be matched to their respective portions of state data using timestamps, sequence numbers, or other order identifiers that may sometimes by applied to image data streams and to associated state data. For example, a portion of image data may sometimes be matched to a portion of state data that has the same order identifier as the portion of image data. In some examples, order identifiers may be added to state data and/or image data by an image data streaming service after its receipt by the image data streaming service.

Figure 13:
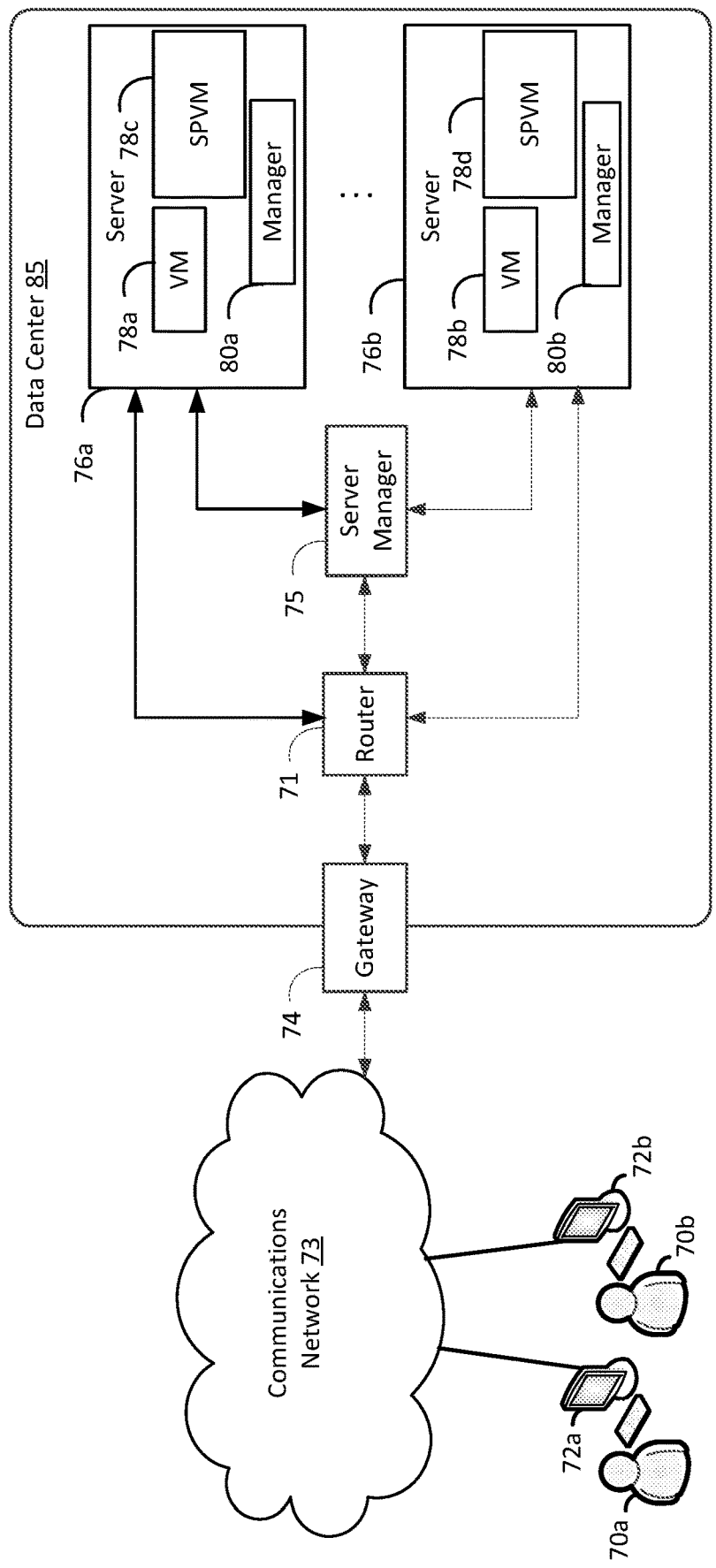
FIG. 13 is a diagram illustrating an example system for transmitting and providing data that may be used in accordance with the present disclosure.

An example system for transmitting and providing data will now be described in detail. In particular, FIG. 13 illustrates an example computing environment in which the embodiments described herein may be implemented. FIG. 13 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are stream provisioning virtual machine ("SPVM") instances. The SPVM virtual machine instances 78c and 78d may be configured to perform all, or any portion, of the techniques for stream provisioning and/or any other of the disclosed techniques in accordance with the present disclosure and described in detail above. As should be appreciated, while the particular example illustrated in FIG. 13 includes one SPVM virtual machine in each server, this is merely an example. A server may include more than one SPVM virtual machine or may not include any SPVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 13, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 13 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 13, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 13, a server manager 75 is also employed to at least in part direct various communications to, from and/or between servers 76a and 76b. While FIG. 13 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 13 has been greatly simplified and that many more networks and networking devices may be utilized to interconnect the various computing systems disclosed herein. These network topologies and devices should be apparent to those skilled in the art.

It should also be appreciated that data center 85 described in FIG. 13 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 14:
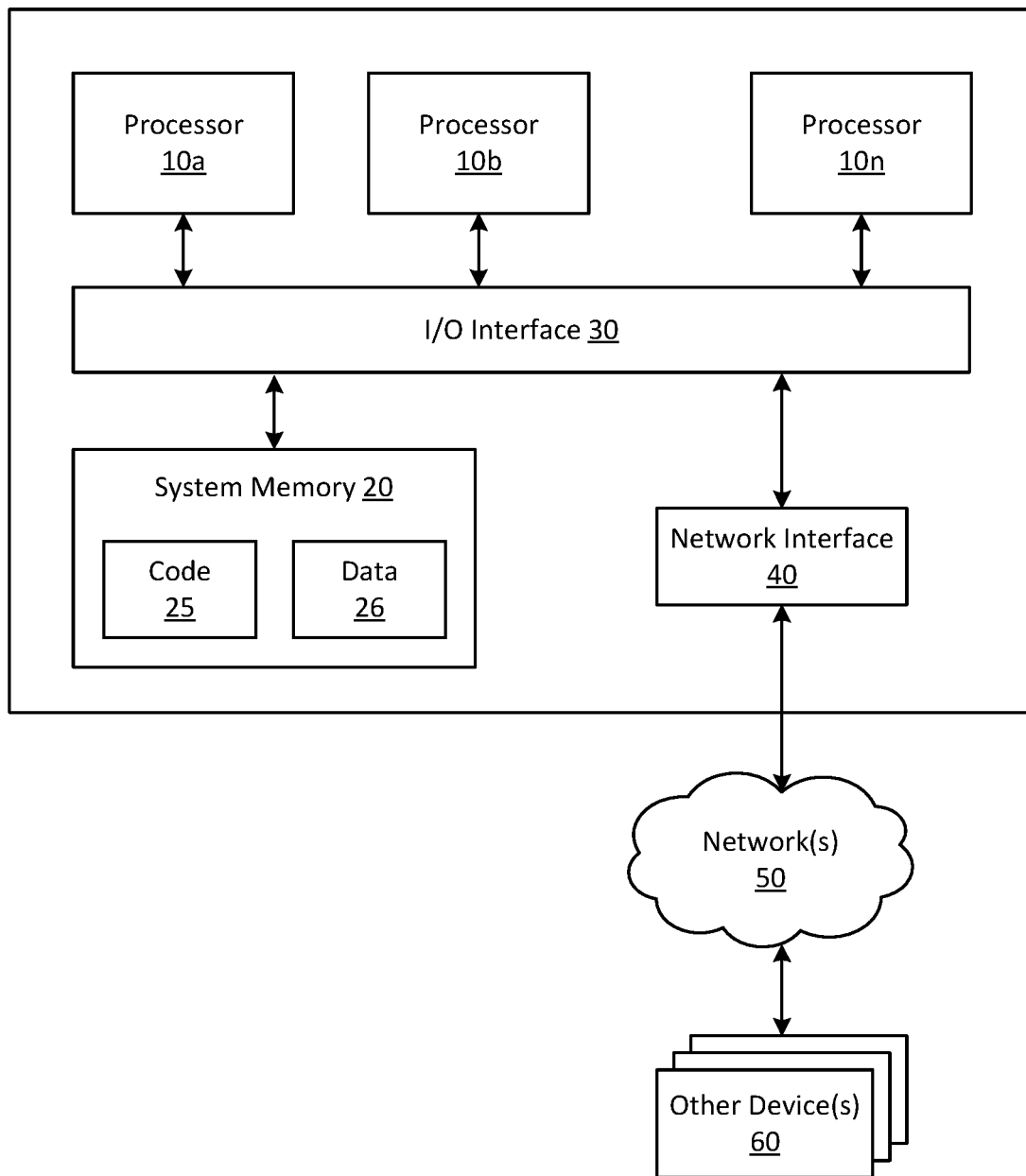
FIG. 14 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 14 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for image data stream provisioning comprising:
   one or more processors; and
   one or more memories having stored therein instructions that, upon execution by the one or more processors, cause the computing system to perform operations comprising:
      receiving, from a spectator, a selected virtual object attribute value for a virtual object attribute associated with objects possessed by characters in a plurality of image data streams captured from one or more video games, wherein the selected virtual object attribute value is used to assist in determining player game video for transmission to the spectator;
      subscribing the spectator to the selected virtual object attribute value;
      receiving, by an image data streaming service, the plurality of image data streams captured from the one or more video games;

receiving, by the image data streaming service, a plurality of state data streams including state data that describes contents of the plurality of image data streams, wherein the state data is generated by the one or more video games and indicates a plurality of stream virtual object attribute values for the virtual object attribute;

comparing the plurality of stream virtual object attribute values in the state data to the selected virtual object attribute value;

matching a first stream virtual object attribute value of the plurality of stream virtual object attribute values in a first state data stream of the plurality of state data streams to the selected virtual object attribute value, wherein the first state data stream corresponds to a first image data stream of the plurality of image data streams;

determining, based at least in part on the matching, that the first image data stream is associated with the spectator; and transmitting the first image data stream to the spectator for display.

2. The computing system of claim 1, wherein the operations further comprise providing an interface that indicates, to the spectator, the virtual object attribute and allows selection, by the spectator, of the selected virtual object attribute value.

3. The computing system of claim 1, wherein the operations comprise transmitting two or more image data streams to the spectator, wherein at least parts of the two or more image data streams are presented to the spectator.

4. The computing system of claim 3, wherein the operations further comprise storing information indicating a plurality of subscriptions for the spectator and at least one of attribute values or image data streams associated with the plurality of subscriptions.

5. A computer-implemented method for image data stream provisioning comprising:

receiving, from a spectator, a selected virtual object attribute value for a virtual object attribute associated with objects possessed by characters in a plurality of image data streams captured from one or more video games, wherein the selected virtual object attribute value is used to assist in determining player game video for transmission to the spectator;

subscribing the spectator to the selected virtual object attribute value;

receiving, by an image data streaming service, the plurality of image data streams captured from the one or more video games;

receiving, by the image data streaming service, a plurality of state data streams including state data that describes contents of the plurality of image data streams, wherein the state data is generated by the one or more video games and indicates a plurality of stream virtual object attribute values for the virtual object attribute;

comparing the plurality of stream virtual object attribute values in the state data to the selected virtual object attribute value;

matching a first stream virtual object attribute value of the plurality of stream virtual object attribute values in a first state data stream of the plurality of state data streams to the selected virtual object attribute value, wherein the first state data stream corresponds to a first image data stream of the plurality of image data streams;

determining, based at least in part on the matching, that the first image data stream is associated with the spectator; and transmitting the first image data stream to the spectator for display.

6. The computer-implemented method of claim 5, further comprising providing an interface that indicates, to the spectator, the virtual object attribute and allows selection, by the spectator, of the selected virtual object attribute value.

7. The computer-implemented method of claim 5, comprising transmitting two or more image data streams to the spectator, wherein at least parts of the two or more image data streams are presented to the spectator.

8. The computer-implemented method of claim 7, further comprising synchronizing at least part of presentation of the two or more image data streams whereby one or more simultaneously occurring events from the two or more image data streams are presented simultaneously.

9. The computer-implemented method of claim 5, further comprising storing information indicating a plurality of subscriptions for the spectator and at least one of attribute values or image data streams associated with the plurality of subscriptions.

10. The computer-implemented method of claim 9, further comprising sharing the information with the spectator and one or more other spectators.

11. One or more non-transitory computer-readable storage media having stored thereon instructions that, upon execution by one or more compute nodes, cause the one or more compute nodes to perform operations comprising:

receiving, from a spectator, a selected virtual object attribute value for a virtual object attribute associated with objects possessed by characters in a plurality of image data streams captured from one or more video games, wherein the selected virtual object attribute value is used to assist in determining player game video for transmission to the spectator;

subscribing the spectator to the selected virtual object attribute value;

receiving, by an image data streaming service, the plurality of image data streams captured from the one or more video games;

receiving, by the image data streaming service, a plurality of state data streams including state data that describes contents of the plurality of image data streams, wherein the state data is generated by the one or more video games and indicates a plurality of stream virtual object attribute values for the virtual object attribute;

comparing the plurality of stream virtual object attribute values in the state data to the selected virtual object attribute value;

matching a first stream virtual object attribute value of the plurality of stream virtual object attribute values in a first state data stream of the plurality of state data streams to the selected virtual object attribute value, wherein the first state data stream corresponds to a first image data stream of the plurality of image data streams;

determining, based at least in part on the matching, that the first image data stream is associated with the spectator; and transmitting the first image data stream to the spectator for display.

12. The one or more non-transitory computer-readable storage media of claim 11, wherein the operations further comprise providing an interface that indicates, to the spectator, the virtual object attribute and allows selection, by the spectator, of the selected virtual object attribute value.

13. The one or more non-transitory computer-readable storage media of claim 11, wherein the operations comprise transmitting two or more image data streams to the spectator, wherein at least parts of the two or more image data streams are presented to the spectator.

14. The one or more non-transitory computer-readable storage media of claim 13, wherein the operations further comprise synchronizing at least part of presentation of the two or more image data streams whereby one or more simultaneously occurring events from the two or more image data streams are presented.

15. The one or more non-transitory computer-readable storage media of claim 11, wherein the operations further comprise storing information indicating a plurality of subscriptions for the spectator and at least one of attribute values or image data streams associated with the plurality of subscriptions.

16. The one or more non-transitory computer-readable storage media of claim 15, wherein the operations further comprise sharing the information with the spectator and one or more other spectators.

17. The computing system of claim 1, wherein the virtual object attribute is a virtual weapon identifier attribute.

18. The computer-implemented method of claim 5, wherein the virtual object attribute is a virtual weapon identifier attribute.

19. The one or more non-transitory computer-readable storage media of claim 11, wherein the virtual object attribute is a virtual weapon identifier attribute.

* * * * *